US011383435B2

(12) United States Patent
Olubummo et al.

(10) Patent No.: US 11,383,435 B2
(45) Date of Patent: Jul. 12, 2022

(54) THREE-DIMENSIONAL PRINTING

(71) Applicant: Hewlett-Packard Development Company, L.P., Spring, TX (US)

(72) Inventors: Adekunle Olubummo, Palo Alto, CA (US); Kyle Wycoff, Palo Alto, CA (US); Aja Hartman, Palo Alto, CA (US); Lihua Zhao, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/047,723

(22) PCT Filed: Apr. 29, 2019

(86) PCT No.: PCT/US2019/029641
§ 371 (c)(1),
(2) Date: Oct. 15, 2020

(87) PCT Pub. No.: WO2020/060588
PCT Pub. Date: Mar. 26, 2020

(65) Prior Publication Data
US 2021/0354375 A1    Nov. 18, 2021

Related U.S. Application Data

(63) Continuation-in-part of application No. PCT/US2018/052327, filed on Sep. 22, 2018.

(51) Int. Cl.
*B29C 64/165* (2017.01)
*B33Y 10/00* (2015.01)
(Continued)

(52) U.S. Cl.
CPC .......... *B29C 64/165* (2017.08); *B29C 64/268* (2017.08); *B33Y 10/00* (2014.12);
(Continued)

(58) Field of Classification Search
CPC ... B29C 64/165; B29C 64/268; B29C 64/153; B29C 64/194; B33Y 10/00; B33Y 30/00;
(Continued)

(56) References Cited

U.S. PATENT DOCUMENTS 3,923,924 A * 12/1975 Wells ....................... C08K 5/13
                                                524/913
9,096,759 B2    8/2015 Wagman et al.
(Continued)

FOREIGN PATENT DOCUMENTS

CN      103756293 A    4/2014
CN      105229060 A    1/2016
(Continued)

OTHER PUBLICATIONS

Deshpande, Anushree, Synthesis and Characterization of in-situ Nylon-6—Epoxy Blends, Aug. 31, 2016, University of Cincinnati.
(Continued)

*Primary Examiner* — Timothy Kennedy
*Assistant Examiner* — Guy F Mongelli
(74) *Attorney, Agent, or Firm* — Dierker & Kavanaugh PC

(57) ABSTRACT

In an example of a method for three-dimensional (3D) printing, a build material composition is applied to form a build material layer. The build material composition includes a polyamide. The polyamide is selectively melted, based on a 3D object model, in at least a portion of the build material layer to form a molten portion including molten polyamide. An epoxy agent is selectively applied, based on the 3D object model, on the molten portion of the build material layer. The epoxy agent includes a polyfunctional epoxy, which crosslinks the molten polyamide in the molten portion.

14 Claims, 4 Drawing Sheets

(51) Int. Cl.
*B33Y 30/00* (2015.01)
*B33Y 70/00* (2020.01)
*B29C 64/268* (2017.01)
*C08K 5/17* (2006.01)
*C08L 63/00* (2006.01)
*C08L 77/04* (2006.01)
*B29K 63/00* (2006.01)
*B29K 77/00* (2006.01)
*B29K 105/00* (2006.01)
*B29K 105/24* (2006.01)

(52) U.S. Cl.
CPC .............. *B33Y 30/00* (2014.12); *B33Y 70/00* (2014.12); *C08K 5/17* (2013.01); *C08L 63/00* (2013.01); *C08L 77/04* (2013.01); *B29K 2063/00* (2013.01); *B29K 2077/00* (2013.01); *B29K 2105/0032* (2013.01); *B29K 2105/24* (2013.01)

(58) Field of Classification Search
CPC ........... B33Y 70/00; C08K 5/17; C08L 63/00; C08L 77/04; C08L 77/00; B29K 2063/00; B29K 2077/00; B29K 2105/0032; B29K 2105/24; C08G 59/54
See application file for complete search history.

(56) References Cited

U.S. PATENT DOCUMENTS

| | | |
|---|---|---|
| 2004/0036200 A1 | 2/2004 | Patel et al. |
| 2005/0014005 A1 | 1/2005 | Kramer et al. |
| 2006/0173141 A1 | 8/2006 | Ando et al. |
| 2007/0120921 A1 | 5/2007 | Carlini et al. |
| 2013/0030124 A1* | 1/2013 | Tomoi .................... C08L 77/06 152/450 |
| 2014/0058013 A1* | 2/2014 | Wang ......................... C08J 5/24 523/400 |
| 2014/0141168 A1 | 5/2014 | Rodgers |
| 2017/0036403 A1 | 2/2017 | Ruff et al. |
| 2018/0243978 A1 | 8/2018 | Nguyen et al. |
| 2018/0258559 A1 | 9/2018 | Dadmun et al. |
| 2019/0039293 A1 | 2/2019 | Liu et al. |
| 2019/0048188 A1 | 2/2019 | Jogikalmath et al. |
| 2020/0339810 A1* | 10/2020 | Fillot .................... C08L 77/06 |
| 2021/0016499 A1* | 1/2021 | Olevsky ................. B22F 10/00 |
| 2021/0024417 A1* | 1/2021 | Thompson ............... B29B 7/90 |

FOREIGN PATENT DOCUMENTS

| | | |
|---|---|---|
| CN | 105778423 A | 7/2016 |
| CN | 105907043 A | 8/2016 |
| CN | 107548347 A | 1/2018 |
| JP | 2005-035299 A | 2/2005 |
| KR | 10-1831819 B1 | 2/2018 |
| WO | 2014/184351 A1 | 11/2014 |
| WO | 2015/080059 A1 | 6/2015 |
| WO | WO-2016124432 A1 | 8/2016 |
| WO | 2017/046132 A1 | 3/2017 |
| WO | 2017/184135 A1 | 10/2017 |
| WO | 2017/184136 A1 | 10/2017 |
| WO | 2017/196330 A1 | 11/2017 |
| WO | WO-2017196361 A1 | 11/2017 |
| WO | 2018/115767 A1 | 6/2018 |
| WO | 2018/167067 A1 | 9/2018 |

OTHER PUBLICATIONS

Handbook of Plastics, Edited By V. Kataev. and Etc., vol. 2, Moscow, Publishing House Chemistry, 1975, p. 216, 217, Annex "N-Aminoethylpiperazine".

* cited by examiner

THREE-DIMENSIONAL PRINTING

CROSS-REFERENCE TO RELATED APPLICATIONS

This application claims priority to International Patent Application Number PCT/US2018/052327, filed Sep. 22, 2018; the disclosure of which is incorporated by reference herein in its entirety.

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material (which, in some examples, may include build material, binder and/or other printing liquid(s), or combinations thereof). This is unlike traditional machining processes, which often rely upon the removal of material to create the final part. Some 3D printing methods use chemical binders or adhesives to bind build materials together. Other 3D printing methods involve at least partial curing, thermal merging/fusing, melting, sintering, etc. of the build material, and the mechanism for material coalescence may depend upon the type of build material used. For some materials, at least partial melting may be accomplished using heat-assisted extrusion, and for some other materials (e.g., polymerizable materials), curing or fusing may be accomplished using, for example, ultra-violet light or infrared light.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
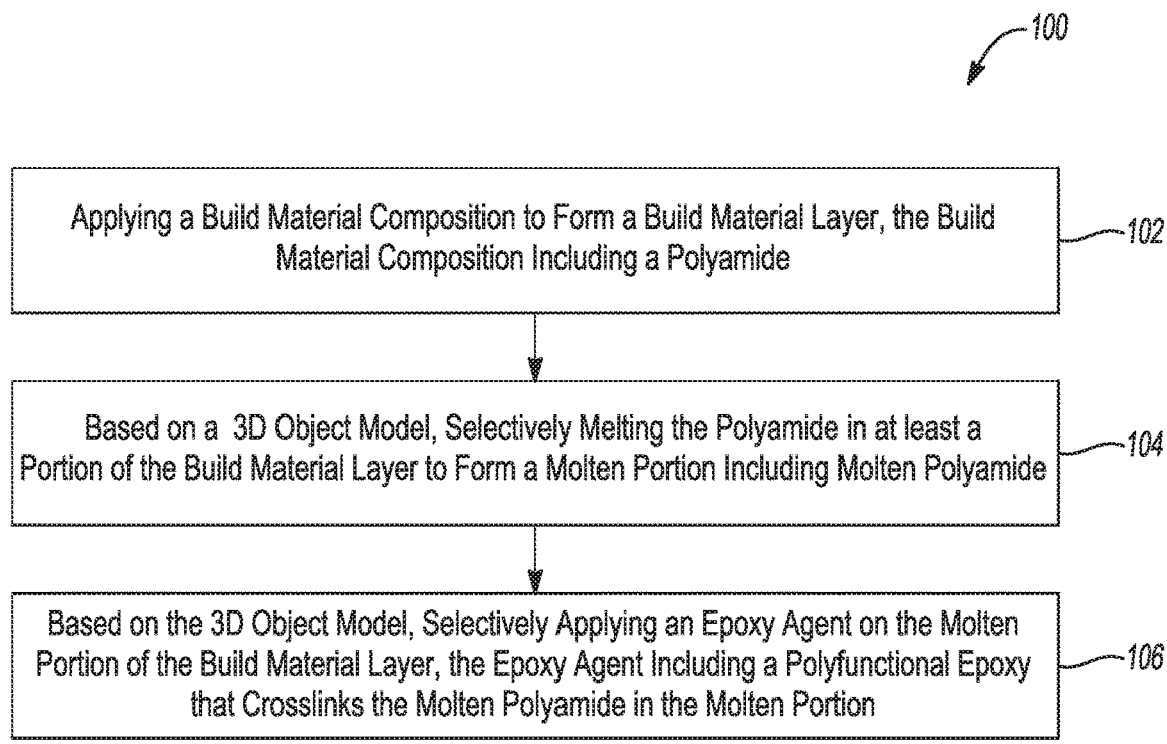
FIG. 1 is a flow diagram depicting an example of a 3D printing method disclosed herein.

In the examples disclosed herein, a build material composition including a polyamide, which has an amino functional group, is utilized with an epoxy agent including a polyfunctional epoxy. During the three-dimensional (3D) printing processes disclosed herein, the epoxy agent may be selectively applied on the polyamide build material in its molten state. By depositing the epoxy agent on the molten polyamide build material, a reaction between the epoxide functional groups of the epoxy and the amino functional groups of the polyamide can be initiated in situ during the three-dimensional (3D) printing processes. It has been found that the resulting crosslinked polymer chains have a restricted degree of freedom during cooling, which reduces their ability to arrange into a well-ordered, e.g., crystal, structure. The resulting crosslinked 3D object has minimal, if any, crystal regions, and thus exhibits desirably high elongation and Young's modulus values. As a result, the objects are less brittle than objects formed without the epoxy agent. The resulting crosslinked 3D object may also exhibit thermal and/or chemical resistance.

Some examples of three-dimensional (3D) printing process disclosed herein utilize a fusing agent (including an energy absorber) to pattern a polyamide build material layer. In the patterned region(s), the fusing agent is capable of at least partially penetrating into voids between the polyamide build material particles, and is also capable of spreading onto the exterior surface of the polyamide build material particles. The fusing agent is capable of absorbing radiation and converting the absorbed radiation to thermal energy, which in turn melts the polyamide build material particles that are in contact with the fusing agent. As such, in these examples, the fusing agent patterns the molten polyamide region(s). In these examples, the entire polyamide build material layer is exposed to radiation, but the patterned region(s) (which, in some instances, is less than the entire layer) alone become the molten region(s).

Other examples of three-dimensional (3D) printing process may utilize selective laser sintering (SLS). During selective laser sintering, a laser beam is aimed at a selected region (which, in some instances, is less than the entire layer) of a polyamide build material layer. Heat from the laser beam causes the polyamide build material particles under the laser beam to melt to form the molten region(s).

Throughout this disclosure, a weight percentage that is referred to as "wt % active" refers to the loading of an active component of a dispersion or other formulation that is present in the epoxy agent and/or fusing agent and/or detailing agent. For example, an energy absorber, such as carbon black, may be present in a water-based formulation (e.g., a stock solution or dispersion) before being incorporated into the fusing agent. In this example, the wt % actives of the carbon black accounts for the loading (as a weight percent) of the carbon black solids that are present in the fusing agent, and does not account for the weight of the other components (e.g., water, etc.) that are present in the stock solution or dispersion with the carbon black. The term "wt %," without the term actives, refers to either i) the loading (in the conductive agent, resistive agent, fusing agent, or detailing agent) of a 100% active component that does not include other non-active components therein, or ii) the loading (in the conductive agent, resistive agent, fusing agent, or detailing agent) of a material or component that is used "as is" and thus the wt % accounts for both active and non-active components.

3D Printing Kits, Multi-fluid Kits, and Compositions

An example of a three-dimensional (3D) printing kit disclosed herein includes a build material composition and an epoxy agent to be applied to at least a molten portion of the build material composition during 3D printing.

In an example, the three-dimensional (3D) printing kit or composition comprises: a build material composition including a polyamide; and an epoxy agent to be applied to at least a molten portion of the build material composition during 3D printing, wherein the epoxy agent includes a polyfunctional epoxy that is to crosslink molten polyamide in the molten portion. Some examples of the three-dimensional (3D) printing kit or composition further comprise a fusing agent to be applied to the at least the portion of the build material composition during 3D printing to pattern the molten portion, the fusing agent including an energy absorber. The epoxy and fusing agents may also be part of a multi-fluid kit for 3D printing.

In some examples, the 3D printing kit or composition consists of the build material composition and the epoxy agent with no other components. In other examples, the 3D printing kit or composition consists of the build material composition, the epoxy agent, and the fusing agent with no other components. The components of the 3D printing kit or composition and/or of the multi-fluid kit may be maintained separately until used together in examples of the 3D printing method disclosed herein.

Example compositions of the build material composition, the epoxy agent, and the fusing agent that are suitable for use in examples of the 3D printing kit or composition are described below.

As used herein, "material set" or "kit" may, in some instances, be synonymous with "composition." Further, "material set" and "kit" are understood to be compositions comprising one or more components where the different components in the compositions are each contained in one or more containers, separately or in any combination, prior to and during printing but these components can be combined together during printing. The containers can be any type of a vessel, box, or receptacle made of any material.

Build Material Compositions

In the examples of the 3D printing kit, the 3D printing composition, the 3D printing methods, and the 3D printing system disclosed herein, a build material composition may be used.

In some examples, the build material composition includes a polyamide. In some of these examples, the build material composition consists of the polyamide without any other components. In others of these examples, the build material composition may include additional components, such as glass, a filler, an antioxidant, a whitener, an antistatic agent, a flow aid, or a combination thereof, with the polyamide.

The polyamide may be any polyamide, which has an amino functional group. In the examples disclosed herein, the polyamide is selected from the group consisting of polyamide 11 (PA 11/nylon 11), polyamide 12 (PA 12/nylon 12), polyamide 12-GB (PA 12-GB/nylon 12-GB), polyamide 6 (PA 6/nylon 6), polyamide 13 (PA 13/nylon 13), polyamide 6,13 (PA 6,13/nylon 6,13), polyamide 8 (PA 8/nylon 8), polyamide 9 (PA 9/nylon 9), polyamide 66 (PA 66/nylon 66), polyamide 612 (PA 612/nylon 612), polyamide 812 (PA 812/nylon 812), polyamide 912 (PA 912/nylon 912), a polyamide copolymer, and a combination thereof. Examples of polyamide copolymers include polyether block amide (PEBA).

Polyether block amide copolymer particles may be obtained by the polycondensation of a carboxylic acid terminated polyamide (PA 6, PA 11, PA 12) with an alcohol terminated polyether (e.g., polytetramethylene glycol (PTMG), polyethylene glycol (PEG), etc.). Two examples of commercially available PEBA elastomer particles include those known under the tradename of PEBAX® (Arkema) and VESTAMID® E (Evonik Degussa).

It is to be understood that polyamide 12-GB refers to a polyamide 12 including glass beads or another form of glass disclosed herein (mixed therewith or encapsulated therein, e.g., at a weight ratio of the glass to the polyamide 12 within the ranges set forth herein).

In some examples, the polyamide may be in the form of a powder. In other examples, the polyamide may be in the form of a powder-like material, which includes, for example, short fibers having a length that is greater than its width. In some examples, the powder or powder-like material may be formed from, or may include, short fibers that may, for example, have been cut into short lengths from long strands or threads of material.

The polyamide may be made up of similarly sized particles and/or differently sized particles. In an example, the average particle size of the polyamide ranges from about 2 µm to about 200 µm. In another example, the average particle size of the polyamide ranges from about 10 µm to about 110 µm. In still another example, the average particle size of the polyamide ranges from about 20 µm to about 100 µm. The term "average particle size", as used herein, may refer to a number-weighted mean diameter or a volume-weighted mean diameter of a particle distribution.

The polyamide may have a wide processing window of greater than 5° C., which can be defined by the temperature range between the melting point and the re-crystallization temperature. As examples, the polyamide may have a melting point ranging from about 130° C. to about 250° C. Depending upon the polyamide, the melting point may range from about 155° C. to about 215° C., or from about 160° C. to about 200° C., or from about 130° C. to about 175° C., or from about 170° C. to about 190° C., or from about 182° C. to about 189° C. As another example, the polyamide may have a melting point of about 180° C.

In some examples, the polyamide does not substantially absorb radiation having a wavelength within the range of 400 nm to 1400 nm. In other examples, the polyamide does not substantially absorb radiation having a wavelength within the range of 800 nm to 1400 nm. In still other examples, the polyamide does not substantially absorb radiation having a wavelength within the range of 400 nm to 1200 nm. In these examples, the polyamide may be considered to reflect the wavelengths at which the polyamide does not substantially absorb radiation. The phrase "does not substantially absorb" means that the absorptivity of the polyamide at a particular wavelength is 25% or less (e.g., 20%, 10%, 5%, etc.).

In some examples, the polyamide may also include glass therein (e.g., when the polyamide is a polyamide 12-GB). In some of these examples, the glass may be dry blended with the polyamide. In others of these examples, the glass may be encapsulated by the polyamide. When the glass is encapsulated by the polyamide, the polyamide may form a continuous coating (i.e., none of the glass is exposed) or a substantially continuous coating (i.e., 5% or less of the glass is exposed) on the glass.

Whether the glass is dry blended with the polyamide or encapsulated by the polyamide may depend, in part, on (i) the characteristics of the glass, and (ii) the 3D printer with which the build material composition is to be used. As an example, when the glass includes glass fibers and/or crushed glass, the glass may be encapsulated by the polyamide. As another example, when segregation of dry blended polyamide and glass may occur and cause damage to the 3D printer in which the build material composition is to be used, the glass may be encapsulated by the polyamide.

When the glass is dry blended with the polyamide, the average particle size of the glass may range from about 5 μm to about 100 μm.

When the glass is encapsulated by the polyamide, the average particle size of the glass (prior to being coated) may range from about 5 μm to about 100 μm or from about 30 μm to about 50 μm. The average particle size of the encapsulated material (i.e., the glass coated with the polyamide) may depend upon the size of the glass prior to coating and the thickness of the polyamide that is applied to the glass. In an example, the average particle size of the encapsulated build material may range from about 10 μm to about 200 μm. In another example, the average particle size of the encapsulated build material may range from about 20 μm to about 120 μm.

The weight ratio of the glass to the polyamide (e.g., polyamide 12) may range from about 5:95 to about 60:40. In some examples, the weight ratio of the glass to the polyamide may range from about 10:90 to about 60:40; or from about 20:80 to about 60:40; or from about 40:60 to about 60:40; or from about 5:95 to about 40:60; or from about 5:95 to about 50:50. In some instances, additives (e.g., antioxidant(s), whitener(s), antistatic agent(s), flow aid(s), etc.) may be included with the polyamide and glass. In these instances, the weight of the polyamide, for the purpose of determining the weight ratio of the glass to the polyamide, may include the weight of the additives in addition to the weight of the polymer. In other instances, the weight of the polyamide, for the purpose of determining the weight ratio of the glass to the polyamide, includes the weight of the polymer alone (whether or not additives are included in the build material composition). The weight ratio of the glass to the polyamide may depend, in part, on the desired properties of the 3D object to be formed, the glass used, the polyamide used, and/or the additives included in the polyamide.

In one example, the glass may be selected from the group consisting of solid glass beads, hollow glass beads, porous glass beads, glass fibers, crushed glass, and a combination thereof. In another example, the glass may be selected from the group consisting of soda lime glass ($Na_2O/CaO/SiO_2$), borosilicate glass, phosphate glass, fused quartz, and a combination thereof. In still another example, the glass may be selected from the group consisting of soda lime glass, borosilicate glass, and a combination thereof. In yet other examples, the glass may be any type of non-crystalline silicate glass.

In some examples, a surface of the glass may be modified with a functional group selected from the group consisting of an acrylate functional silane, a methacrylate functional silane, an epoxy functional silane, an ester functional silane, an amino functional silane, and a combination thereof. Examples of the glass modified with such functional groups and/or such functional groups that may be used to modify the glass are available from Potters Industries, LLC (e.g., an epoxy functional silane or an amino functional silane), Gelest, Inc. (e.g., an acrylate functional silane or a methacrylate functional silane), Sigma-Aldrich (e.g., an ester functional silane), etc. In an example, the surface of the glass is modified with an amino functional silane. In another example, the surface of the glass may be modified with an epoxy functional silane. In other examples, a surface of the glass is not modified with any functional group.

In some examples, the build material composition, in addition to the polyamide (and in some instances the glass), may include a filler, an antioxidant, a whitener, an antistatic agent, a flow aid, or a combination thereof. While several examples of these additives are provided, it is to be understood that these additives are selected to be thermally stable (i.e., will not decompose) at the 3D printing temperatures.

Filler(s) may be added to the build material composition to modify the properties of the 3D parts to be printed. Examples of suitable fillers include alumina, silica, talc, and a combination thereof. In an example, the filler may be included in the build material composition in an amount ranging from about 1 wt % to about 60 wt %, based on the total weight of the build material composition.

Antioxidant(s) may be added to the build material composition to prevent or slow molecular weight decreases of the polyamide and/or may prevent or slow discoloration (e.g., yellowing) of the polyamide by preventing or slowing oxidation of the polyamide. In some examples, the antioxidant may discolor upon reacting with oxygen, and this discoloration may contribute to the discoloration of the build material composition. The antioxidant may be selected to minimize this discoloration. In some examples, the antioxidant may be a radical scavenger. In these examples, the antioxidant may include IRGANOX® 1098 (benzenepropanamide, N,N'-1,6-hexanediylbis(3,5-bis(1,1-dimethylethyl)-4-hydroxy)), IRGANOX® 254 (a mixture of 40% triethylene glycol bis(3-tert-butyl-4-hydroxy-5-methylphenyl), polyvinyl alcohol and deionized water), and/or other sterically hindered phenols. In other examples, the antioxidant may include a phosphite and/or an organic sulfide (e.g., a thioester). The antioxidant may be in the form of fine particles (e.g., having an average particle size of 5 μm or less) that are dry blended with the polyamide. In an example, the antioxidant may be included in the build material composition in an amount ranging from about 0.01 wt % to about 5 wt %, based on the total weight of the build material composition. In other examples, the antioxidant may be included in the build material composition in an amount ranging from about 0.01 wt % to about 2 wt % or from about 0.2 wt % to about 1 wt %, based on the total weight of the build material composition.

Whitener(s) may be added to the build material composition to improve visibility. Examples of suitable whiteners include titanium dioxide ($TiO_2$), zinc oxide (ZnO), calcium carbonate ($CaCO_3$), zirconium dioxide ($ZrO_2$), aluminum oxide ($Al_2O_3$), silicon dioxide ($SiO_2$), boron nitride (BN), and combinations thereof. In some examples, a stilbene derivative may be used as the whitener and a brightener. In these examples, the temperature(s) of the 3D printing process may be selected so that the stilbene derivative remains stable (i.e., the 3D printing temperature does not thermally decompose the stilbene derivative). In an example, any example of the whitener may be included in the build material composition in an amount ranging from greater than 0 wt % to about 10 wt %, based on the total weight of the build material composition.

Antistatic agent(s) may be added to the build material composition to suppress tribo-charging. Examples of suitable antistatic agents include aliphatic amines (which may be ethoxylated), aliphatic amides, quaternary ammonium salts (e.g., behentrimonium chloride or cocamidopropyl betaine), esters of phosphoric acid, polyethylene glycolesters, or polyols. Some suitable commercially available antistatic agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.). In an example, the antistatic agent is added in an amount ranging from greater than 0 wt % to less than 5 wt %, based upon the total weight of the build material composition.

Flow aid(s) may be added to improve the coating flowability of the build material composition. Flow aids may be particularly beneficial when the build material composition has an average particle size less than 25 µm. The flow aid improves the flowability of the build material composition by reducing the friction, the lateral drag, and the tribocharge buildup (by increasing the particle conductivity). Examples of suitable flow aids include aluminum oxide ($Al_2O_3$), tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), and polydimethylsiloxane (E900). In an example, the flow aid is added in an amount ranging from greater than 0 wt % to less than 5 wt %, based upon the total weight of the build material composition.

In some examples, the build material composition disclosed herein may be reused/recycled. After a print cycle, some of the build material composition disclosed herein remains non-coalesced/non-fused, and can be reclaimed and used again. This reclaimed build material is referred to as the recycled build material composition. The recycled build material composition may be exposed to 2, 4, 6, 8, 10, or more build cycles (i.e., heating to a temperature ranging from about 50° C. to about 205° C. and then cooling), and reclaimed after each cycle. Between cycles, the recycled build material composition may be mixed with at least some fresh (i.e., not previously used in a 3D printing process) build material composition. In some examples, the weight ratio of the recycled build material composition to the fresh build material composition may be 90:10, 80:20, 70:30, 60:40, 50:50, or 40:60. The weight ratio of the recycled build material composition to the fresh build material composition may depend, in part, on the stability of the build material composition, the discoloration of the recycled build material composition (as compared to the build material composition), the desired aesthetics for the 3D object being formed, the thermal decomposition of the recycled build material composition (as compared to the build material composition), and/or the desired mechanical properties of the 3D object being formed.

Epoxy Agents

In the examples of the 3D printing kit, the multi-fluid kit, the 3D printing composition, the 3D printing methods, and the 3D printing system disclosed herein, an epoxy agent including any polyfunctional epoxy may be used.

A polyfunctional epoxy is any molecule including two or more reactive epoxide functional groups. Examples of the polyfunctional epoxy may include two reactive epoxide functional groups, three reactive epoxide functional groups, four reactive epoxide functional groups, five reactive epoxide functional groups, etc. In some examples, the polyfunctional epoxy may be a small molecule with up to five reactive epoxide functional groups. In other examples, the polyfunctional epoxy may a polymer including reactive epoxide functional groups on its backbone. The number of epoxide functional groups on the polymer backbone depends upon the molecular weight of the polymer, which, in an example, ranges from about 500 g/mol to about 100,000 g/mol. A polyfunctional epoxy may be used alone, or a combination of two or more different polyfunctional epoxies may be used together.

A difunctional epoxy is a molecule including two reactive epoxide functional groups. In an example where the polyfunctional epoxy in the epoxy agent includes a difunctional epoxy, the difunctional epoxy is selected from the group consisting of ethylene glycol diglycidyl ether, resorcinol diglycidyl ether, neopentyl glycol diglycidyl ether, 1,6-hexanediol diglycidyl ether, glycerol diglycidyl ether, trimethylolpropane diglycidyl ether, pentaerythritol diglycidyl ether, diglycerol diglycidyl ether, polyglycerol diglycidyl ether, sorbitol diglycidyl ether, diglycidyl terephthalate, diglycidyl o-phthalate, polyethylene glycol diglycidyl ether, and a combination thereof.

A trifunctional epoxy is a molecule including three reactive epoxide functional groups. In an example where the polyfunctional epoxy in the epoxy agent includes a trifunctional epoxy, the trifunctional epoxy is selected the group consisting of triphenylolmethane triglycidyl ether, glycerol triglycidyl ether, trimethylolpropane triglycidyl ether, pentaerythritol triglycidyl ether, diglycerol triglycidyl ether, polyglycerol triglycidyl ether, sorbitol triglycidyl ether, and a combination thereof.

Other example polyfunctional epoxies include more than three reactive epoxide functional groups. As examples, the polyfunctional epoxy is selected from the group consisting of tetraphenylolethane glycidyl ether, pentaerythritol glycidyl ether, and a combination thereof. Some polyfunctional epoxies may include any number of epoxide functional groups, depending upon the molecular weight of the material. Examples of these polyfunctional epoxies include poly (glycidyl methacrylate), poly(ethylene-co-glycidyl methacrylate), poly(tert-butyl methacrylate-co-glycidyl methacrylate), and poly(pentabromobenzyl methacrylate-co-glycidyl methacrylate).

In an example, the polyfunctional epoxy pf the epoxy agent is selected from the group consisting of tetraphenylolethane glycidyl ether, pentaerythritol glycidyl ether, poly (glycidyl methacrylate), poly(ethylene-co-glycidyl methacrylate), poly(tert-butyl methacrylate-co-glycidyl methacrylate), and poly(pentabromobenzyl methacrylate-co-glycidyl methacrylate).

In an example where the epoxy agent includes a combination of different polyfunctional epoxies, two or more di-, tri-, etc. functional epoxies may be used together, or two or more functional epoxies with different number of reactive epoxide groups may be used together (e.g., a difunctional epoxy and a trifunctional epoxy may be used in the same epoxy agent).

In some examples, the polyfunctional epoxy has a viscosity at 25° C. ranging from about 5 mPa·s to about 40 mPa·s. In one of these examples, the polyfunctional epoxy has a viscosity at 25° C. of about 20 mPa·s. The polyfunctional epoxy viscosity may be higher as long as it can be formulated into a jettable composition. In one example, the polyfunctional epoxy is trimethylolpropane polyglycidyl ether, which has a viscosity at 25° C. of 130 mPa·s. In other examples of the 3D printing kit or composition and/or of the multi-fluid kit, the polyfunctional epoxy has a viscosity at 25° C. ranging from about 5 mPa·s to about 140 mPa·s.

In some examples, the polyfunctional epoxy is water-soluble. In some of these examples, the polyfunctional epoxy is also soluble in a co-solvent of the polyfunctional epoxy agent. In some examples, the polyfunctional epoxy has a high enough solubility in water and/or in the co-solvent that the polyfunctional epoxy may be fully dissolved in the epoxy agent. In other examples, the polyfunctional epoxy may have a high enough solubility in water and/or in the co-solvent that the polyfunctional epoxy may be partially dissolved and partially dispersed in the epoxy agent. It may be desirable for the epoxy to be fully dissolved in the epoxy agent so that jetting performance and/or pen health is not deleteriously affected when the epoxy agent is jetted via thermal inkjet printing, piezoelectric inkjet printing, or continuous inkjet printing.

In some examples, the polyfunctional epoxy is present in the epoxy agent in an amount ranging from about 2 wt % active to about 50 wt % active, based on a total weight of the epoxy agent. In one example, the polyfunctional epoxy is present in the epoxy agent in an amount of about 20 wt % active, based on the total weight of the epoxy agent.

In some examples, the epoxy agent includes an aqueous vehicle, in addition to the epoxy. As used herein, the term "aqueous vehicle" may refer to the liquid in which the polyfunctional epoxy is dispersed or dissolved to form the epoxy agent. A wide variety of aqueous vehicles may be used in the epoxy agent.

In some examples, the aqueous vehicle may include water alone with no other components. In other examples, the aqueous vehicle may include other components, depending, in part, upon the applicator that is to be used to dispense the epoxy agent. Examples of other suitable epoxy agent components include co-solvent(s), humectant(s), surfactant(s), antimicrobial agent(s), anti-kogation agent(s), and/or chelating agent(s).

In an example, the aqueous vehicle includes a co-solvent, a surfactant, and a balance of water. In another example, the aqueous vehicle consists of a co-solvent, a surfactant, and a balance of water. In still another example, the aqueous vehicle consists of a co-solvent, a surfactant, an additive selected from the group consisting of a humectant, an antimicrobial agent, an anti-kogation agent, a chelating agent, and a combination thereof, and a balance of water.

Classes of organic co-solvents that may be used in the epoxy agent include aliphatic alcohols, aromatic alcohols, diols, glycol ethers, polyglycol ethers, lactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, 1,6-hexanediol or other diols (e.g., 1,5-pentanediol, 2-methyl-1,3-propanediol, etc.), ethylene glycol alkyl ethers (e.g., diethylene glycol butyl ether), propylene glycol alkyl ethers, higher homologs ($C_6$-$C_{12}$) of polyethylene glycol alkyl ethers, triethylene glycol, tetraethylene glycol, tripropylene glycol methyl ether, N-alkyl caprolactams, unsubstituted caprolactams, 2-pyrrolidone, 1-methyl-2-pyrrolidone, N-(2-hydroxyethyl)-2-pyrrolidone, both substituted and unsubstituted formamides, both substituted and unsubstituted acetamides, and the like. Other examples of organic co-solvents include dimethyl sulfoxide (DMSO), isopropyl alcohol, ethanol, pentanol, acetone, or the like.

Some examples of suitable co-solvents include water-soluble high-boiling point solvents, which have a boiling point of at least 120° C., or higher. Some examples of high-boiling point solvents include 2-pyrrolidone (i.e., 2-pyrrolidinone, boiling point of about 245° C.), 1-methyl-2-pyrrolidone (boiling point of about 203° C.), N-(2-hydroxyethyl)-2-pyrrolidone (boiling point of about 140° C.), 2-methyl-1,3-propanediol (boiling point of about 212° C.), and combinations thereof.

The co-solvent(s) may be present in the epoxy agent in a total amount ranging from about 1 wt % to about 50 wt % based upon the total weight of the epoxy agent, depending upon the jetting architecture of the applicator. In an example, the total amount of the co-solvent(s) present in the epoxy agent is about 22 wt % based on the total weight of the epoxy agent.

The aqueous vehicle may also include humectant(s). In an example, the total amount of the humectant(s) present in the epoxy agent ranges from about 3 wt % active to about 10 wt % active, based on the total weight of the epoxy agent. An example of a suitable humectant is ethoxylated glycerin having the following formula:

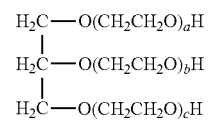

in which the total of a+b+c ranges from about 5 to about 60, or in other examples, from about 20 to about 30. An example of the ethoxylated glycerin is LIPONIC® EG-1 (LEG-1, glycereth-26, a+b+c=26, available from Lipo Chemicals). Some of the listed co-solvents (e.g., diethylene glycol butyl ether) may also function as a humectant, and thus the humectant may be present in any of the amount set forth for the co-solvent.

In some examples, the aqueous vehicle includes surfactant(s) to improve the jettability of the epoxy agent. Examples of suitable surfactants include a self-emulsifiable, non-ionic wetting agent based on acetylenic diol chemistry (e.g., SURFYNOL® SEF from Evonik Degussa), a non-ionic fluorosurfactant (e.g., CAPSTONE® fluorosurfactants, such as CAPSTONE® FS-35, from Chemours), and combinations thereof. In other examples, the surfactant is an ethoxylated low-foam wetting agent (e.g., SURFYNOL® 440 or SURFYNOL® CT-111 from Evonik Degussa) or an ethoxylated wetting agent and molecular defoamer (e.g., SURFYNOL® 420 from Evonik Degussa). Still other suitable surfactants include non-ionic wetting agents and molecular defoamers (e.g., SURFYNOL® 104E from Evonik Degussa) or water-soluble, non-ionic surfactants (e.g., TERGITOL™ TMN-6, TERGITOL™ 15-S-7, or TERGITOL™ 15-S-9 (a secondary alcohol ethoxylate) from The Dow Chemical Company or TEGO® Wet 510 (polyether siloxane) available from Evonik Degussa). Yet another suitable surfactant includes alkyldiphenyloxide disulfonate (e.g., the DOWFAX™ series, such a 2A1, 3B2, 8390, C6L, C10L, and 30599, from The Dow Chemical Company).

Whether a single surfactant is used or a combination of surfactants is used, the total amount of surfactant(s) in the epoxy agent may range from about 0.01 wt % active to about 10 wt % active based on the total weight of the epoxy agent. In an example, the total amount of surfactant(s) in the epoxy agent may be about 3 wt % active based on the total weight of the epoxy agent.

An anti-kogation agent may be included in the epoxy agent that is to be jetted using thermal inkjet printing. Kogation refers to the deposit of dried printing liquid (e.g., epoxy agent) on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS® 03A or CRODAFOS® N-3 acid from Croda), dextran 500k, CRODAFOS™ HCE (phosphate-ester from Croda Int.), CRODAFOS® N10 (oleth-10-phosphate from Croda Int.), DISPERSOGEN® LFH (polymeric dispersing agent with aromatic anchoring groups, acid form, anionic, from Clariant), or a combination of oleth-3-phosphate and a low molecular weight (e.g., <5,000) acrylic acid polymer (e.g., commercially available as CARBOSPERSE™ K-7028 Polyacrylate from Lubrizol).

Whether a single anti-kogation agent is used or a combination of anti-kogation agents is used, the total amount of anti-kogation agent(s) in the epoxy agent may range from greater than 0.10 wt % active to about 1.5 wt % active based on the total weight of the epoxy agent. In an example, the oleth-3-phosphate is included in an amount ranging from about 0.20 wt % active to about 0.60 wt % active, and the low molecular weight polyacrylic acid polymer is included in an amount ranging from about 0.005 wt % to about 0.03 wt %.

The aqueous vehicle may also include antimicrobial agent(s). Suitable antimicrobial agents include biocides and fungicides. Example antimicrobial agents may include the NUOSEPT™ (Troy Corp.), UCARCIDE™ (Dow Chemical Co.), ACTICIDE® B20 (Thor Chemicals), ACTICIDE® M20 (Thor Chemicals), ACTICIDE® MBL (blends of 2-methyl-4-isothiazolin-3-one (MIT), 1,2-benzisothiazolin-3-one (BIT) and Bronopol) (Thor Chemicals), AXIDE™ (Planet Chemical), NIPACIDE™ (Clariant), blends of 5-chloro-2-methyl-4-isothiazolin-3-one (CIT or CMIT) and MIT under the tradename KATHON™ (Dow Chemical Co.), and combinations thereof. Examples of suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from Dow Chemical Co.).

In an example, the epoxy agent may include a total amount of antimicrobial agents that ranges from about 0.0001 wt % active to about 1 wt % active. In an example, the antimicrobial agent(s) is/are a biocide(s) and is/are present in the epoxy agent in an amount of about 0.25 wt % active (based on the total weight of the epoxy agent).

Chelating agents (or sequestering agents) may be included in the aqueous vehicle to eliminate the deleterious effects of heavy metal impurities. Examples of chelating agents include disodium ethylenediaminetetraacetic acid (EDTA-Na), ethylene diamine tetra acetic acid (EDTA), and methylglycinediacetic acid (e.g., TRILON® M from BASF Corp.).

Whether a single chelating agent is used or a combination of chelating agents is used, the total amount of chelating agent(s) in the epoxy agent may range from greater than 0 wt % active to about 2 wt % active based on the total weight of the epoxy agent. In an example, the chelating agent(s) is/are present in the epoxy agent in an amount of about 0.04 wt % active (based on the total weight of the epoxy agent).

The balance of the epoxy agent is water. As such, the amount of water may vary depending upon the amounts of the other components that are included. In an example, deionized water may be used.

In some, the epoxy agent has a viscosity at 25° C. ranging from about 5 mPa·s to about 90 mPa·s. It is to be understood that the aqueous vehicle components may be selected to achieve a viscosity of the epoxy agent within the disclosed range. The desired viscosity may also depend upon the jetting technology that is to be used.

In some examples, the epoxy agent is jettable via thermal inkjet printing, piezoelectric inkjet printing, continuous inkjet printing, or a combination thereof. As such, the aqueous vehicle components may be selected to achieve the desired jettability. For example, if the epoxy agent is to be jettable via thermal inkjet printing, water may make up 35 wt % or more of the epoxy agent. For another example, if the epoxy agent is to be jettable via piezoelectric inkjet printing, water may make up from about 25 wt % to about 30 wt % of the epoxy agent, and 35 wt % or more of the epoxy agent may be ethanol, isopropanol, acetone, etc.

Fusing Agents

In the examples of the 3D printing kit, the multi-fluid kit, the 3D printing composition, the 3D printing methods, and the 3D printing system disclosed herein, a fusing agent may be used. As such, some examples of the 3D printing kit or composition and/or of the multi-fluid kit further comprise a fusing agent to be applied to at least the portion of the build material composition during 3D printing, wherein the fusing agent includes an energy absorber. In some examples, the energy absorber may have substantial absorption (e.g., 80%) at least in the visible region (400 nm-780 nm) and may also absorb energy in the infrared region (e.g., 800 nm to 4000 nm). In other examples, the energy absorber may have absorption at wavelengths ranging from 800 nm to 4000 nm and have transparency at wavelengths ranging from 400 nm to 780 nm. As used herein "absorption" means that at least 80% of radiation having wavelengths within the specified range is absorbed. Also as used herein, "transparency" means that 25% or less of radiation having wavelengths within the specified range is absorbed.

In some examples, the energy absorber may be an infrared light absorbing colorant. In an example, the energy absorber is a near-infrared light absorber. As such, an example of the fusing agent includes a near-infrared absorbing colorant. Any near-infrared absorbing colorants, e.g., those produced by Fabricolor, Eastman Kodak, or BASF, Yamamoto, may be used in the fusing agent.

As one example, the fusing agent includes a carbon black energy absorber. Examples of this type of fusing agent are printing liquid formulations commercially known as CM997A, 516458, C18928, C93848, C93808, or the like, all of which are available from HP Inc.

As another example, the fusing agent may be a printing liquid formulation including near-infrared absorbing dyes as the energy absorber. Examples of this printing liquid formulation are described in U.S. Pat. No. 9,133,344, incorporated herein by reference in its entirety. Some examples of the near-infrared absorbing dye are water-soluble near-infrared absorbing dyes selected from the group consisting of:

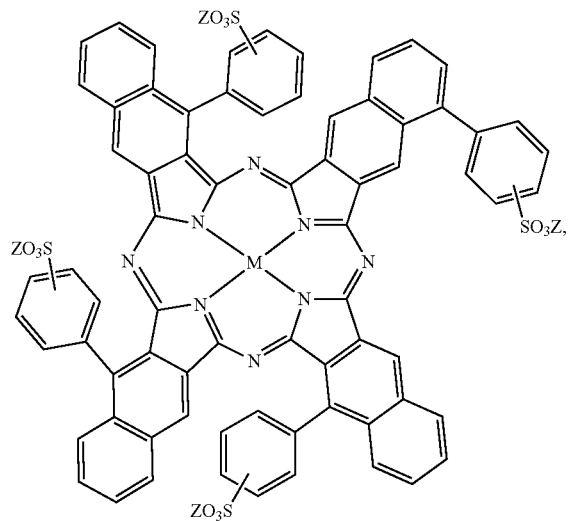
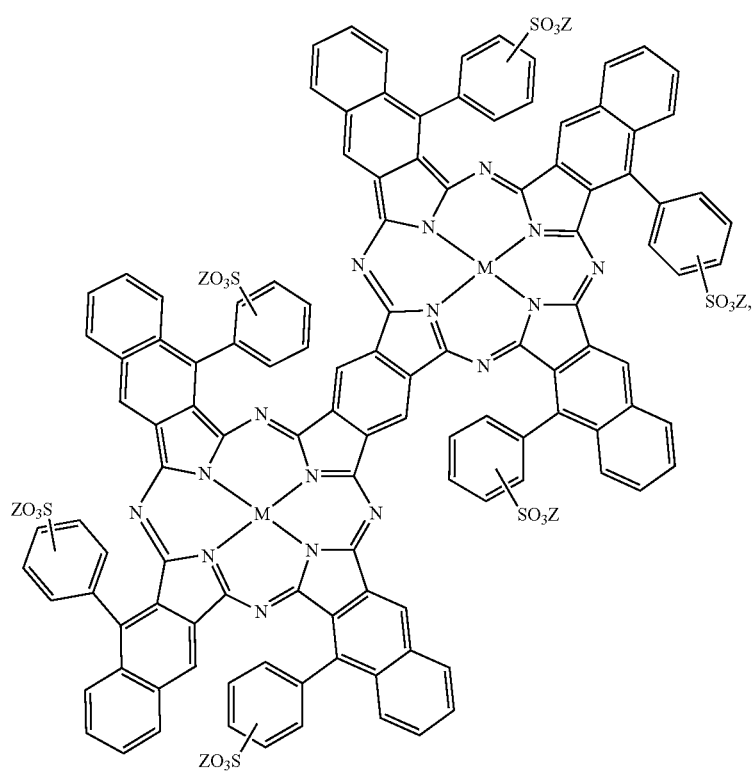

-continued

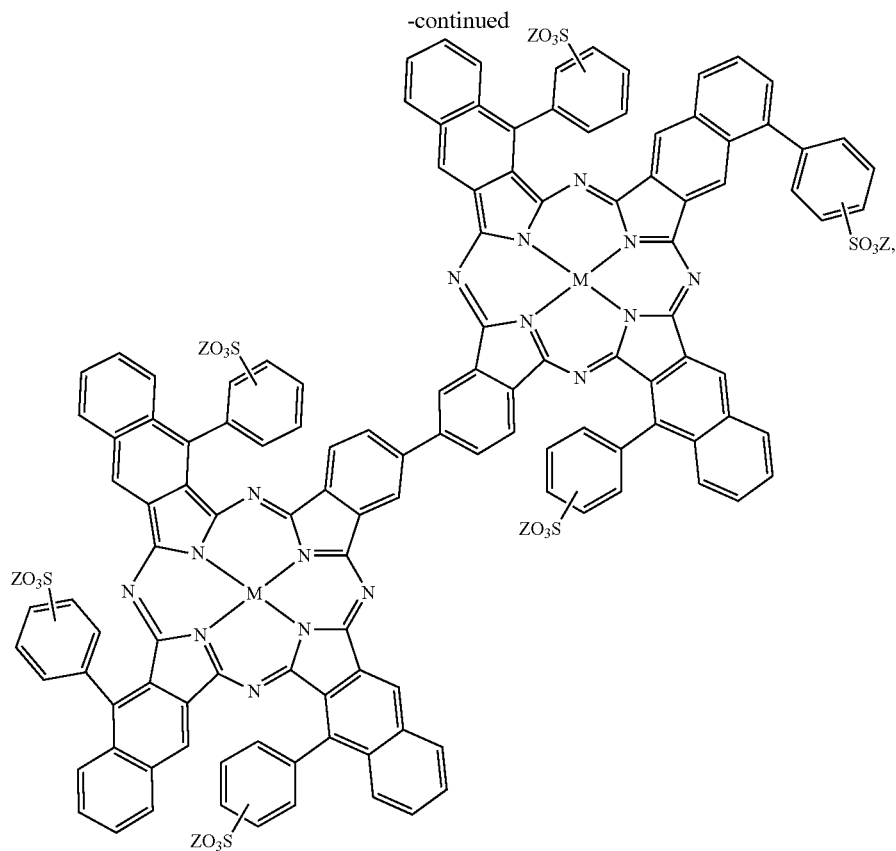

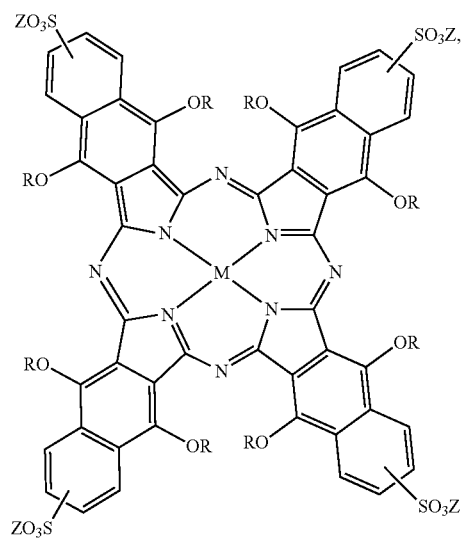

and mixtures thereof. In the above structures, M can be a divalent metal atom (e.g., copper, etc.) or can have $OSO_3Na$ axial groups filling any unfilled valencies if the metal is more than divalent (e.g., indium, etc.), R can be hydrogen or any $C_1$-$C_8$ alkyl group (including substituted alkyl and unsubstituted alkyl), and Z can be a counterion such that the overall charge of the near-infrared absorbing dye is neutral. For example, the counterion can be sodium, lithium, potassium, $NH_4^+$, etc.

Some other examples of the near-infrared absorbing dye are hydrophobic near-infrared absorbing dyes selected from the group consisting of:

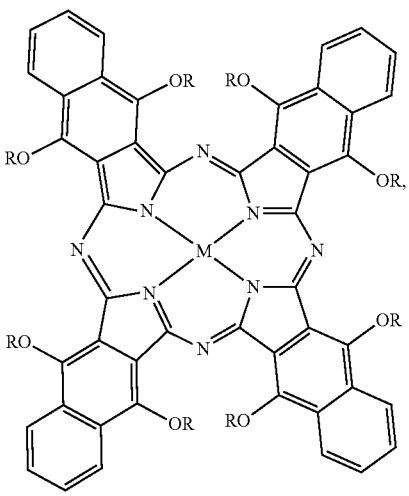

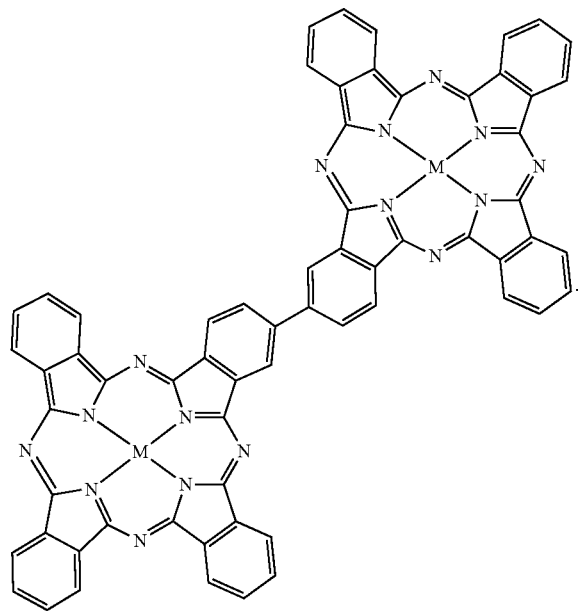

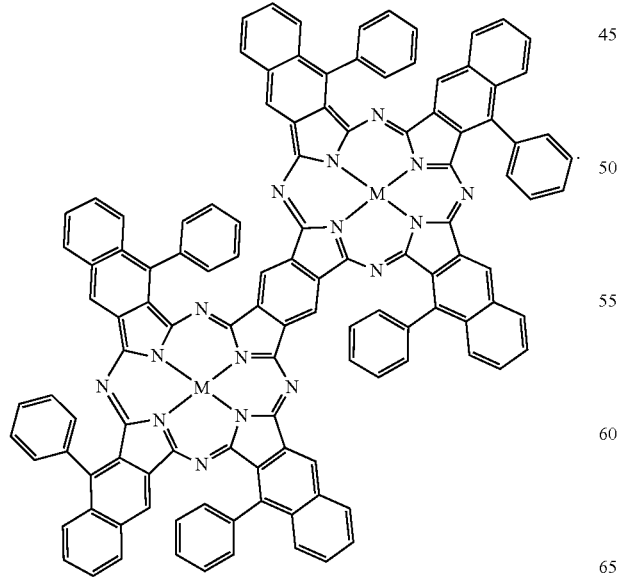

and mixtures thereof. For the hydrophobic near-infrared absorbing dyes, M can be a divalent metal atom (e.g., copper, etc.) or can include a metal that has Cl, Br, or OR' (R'=H, $CH_3$, $COCH_3$, $COCH_2COOCH_3$, $COCH_2COCH_3$) axial groups filling any unfilled valencies if the metal is more than divalent, and R can be hydrogen or any $C_1$-$C_8$ alkyl group (including substituted alkyl and unsubstituted alkyl).

Other near-infrared absorbing dyes or pigments may be used. Some examples include anthroquinone dyes or pigments, metal dithiolene dyes or pigments, cyanine dyes or pigments, perylenediimide dyes or pigments, croconium dyes or pigments, pyrilium or thiopyrilium dyes or pigments, boron-dipyrromethene dyes or pigments, or aza-boron-dipyrromethene dyes or pigments.

Anthroquinone dyes or pigments and metal (e.g., nickel) dithiolene dyes or pigments may have the following structures, respectively:

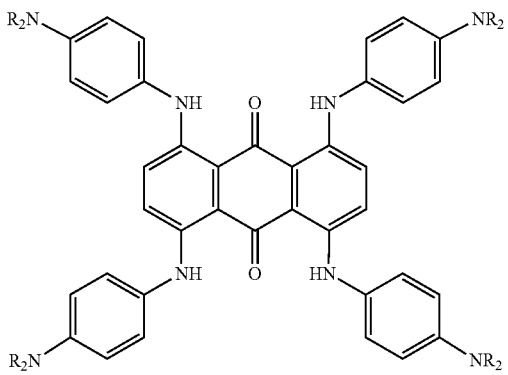

Anthroquinone dyes/pigments

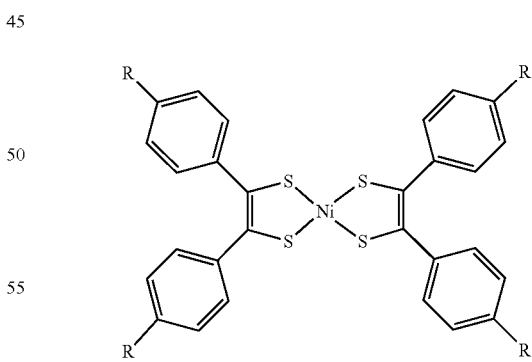

Nickel Dithiolene dyes/pigments where R in the anthroquinone dyes or pigments may be hydrogen or any $C_1$-$C_8$ alkyl group (including substituted alkyl and unsubstituted alkyl), and R in the dithiolene may be hydrogen, COOH, $SO_3$, $NH_2$, any $C_1$-$C_8$ alkyl group (including substituted alkyl and unsubstituted alkyl), or the like.

Cyanine dyes or pigments and perylenediimide dyes or pigments may have the following structures, respectively:

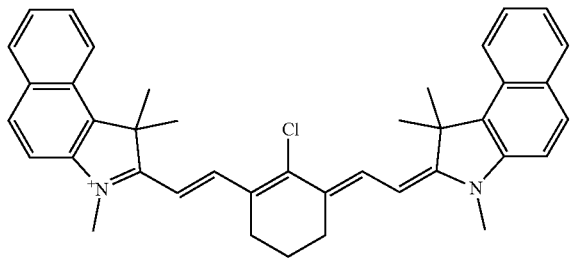

Cyanine dyes/pigments

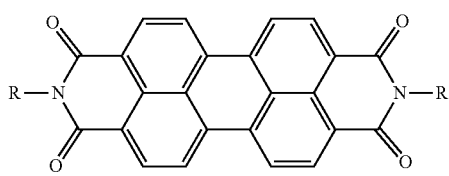

Perylenediimide dyes/pigments where R in the perylenediimide dyes or pigments may be hydrogen or any $C_1$-$C_8$ alkyl group (including substituted alkyl and unsubstituted alkyl).

Croconium dyes or pigments and pyrilium or thiopyrilium dyes or pigments may have the following structures, respectively:

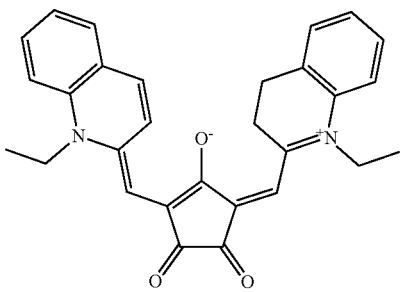

Croconium dyes/pigments

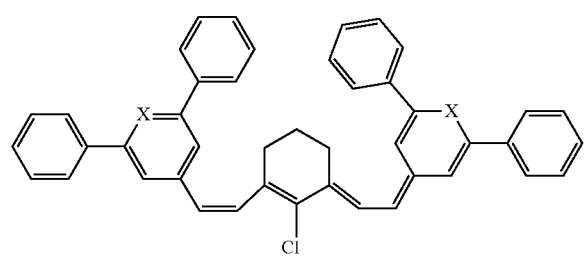

Pyrilium (X = O), thiopyrilium (X = S) dyes/pigments

Boron-dipyrromethene dyes or pigments and aza-boron-dipyrromethene dyes or pigments may have the following structures, respectively:

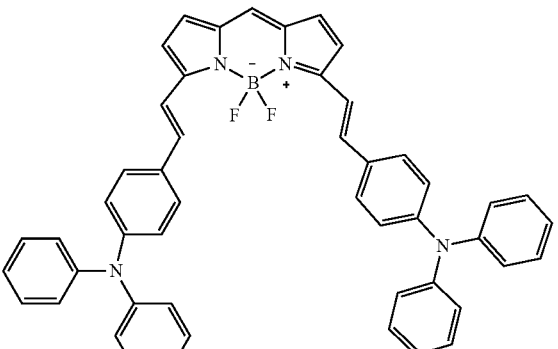

boron-dipyrromethene dyes/pigments

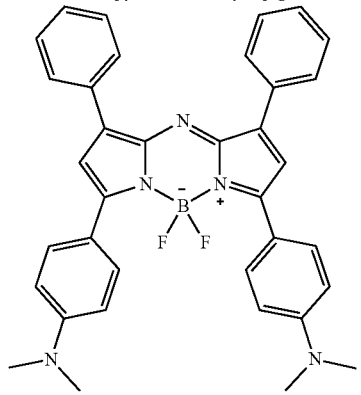

aza-boron-dipyrromethene dyes/pigments

In other examples, the energy absorber may be the energy absorber that has absorption at wavelengths ranging from 800 nm to 4000 nm and transparency at wavelengths ranging from 400 nm to 780 nm. The absorption of this energy absorber is the result of plasmonic resonance effects. Electrons associated with the atoms of the energy absorber may be collectively excited by radiation, which results in collective oscillation of the electrons. The wavelengths that can excite and oscillate these electrons collectively are dependent on the number of electrons present in the energy absorber particles, which in turn is dependent on the size of the energy absorber particles. The amount of energy that can collectively oscillate the particle's electrons is low enough that very small particles (e.g., 1-100 nm) may absorb radiation with wavelengths several times (e.g., from 8 to 800 or more times) the size of the particles. The use of these particles allows the fusing agent to be inkjet jettable as well as electromagnetically selective (e.g., having absorption at wavelengths ranging from 800 nm to 4000 nm and transparency at wavelengths ranging from 400 nm to 780 nm).

In an example, this energy absorber has an average particle diameter (e.g., volume-weighted mean diameter) ranging from greater than 0 nm to less than 220 nm. In another example, the energy absorber has an average particle diameter ranging from greater than 0 nm to 120 nm. In a still another example, the energy absorber has an average particle diameter ranging from about 10 nm to about 200 nm.

In an example, this energy absorber is an inorganic pigment. Examples of suitable inorganic pigments include lanthanum hexaboride ($LaB_6$), tungsten bronzes ($A_xWO_3$), indium tin oxide ($In_2O_3$:$SnO_2$, ITO), antimony tin oxide ($Sb_2O_3$:$SnO_2$, ATO), titanium nitride (TiN), aluminum zinc oxide (AZO), ruthenium oxide ($RuO_2$), silver (Ag), gold (Au), platinum (Pt), iron pyroxenes ($A_xFe_ySi_2O_6$ wherein A is Ca or Mg, x=1.5-1.9, and y=0.1-0.5), modified iron phosphates ($A_xFe_yPO_4$), modified copper phosphates ($A_xCu_yPO_z$), modified copper pyrophosphates ($A_xCu_yP_2O_7$), and combinations thereof. Tungsten bronzes may be alkali doped tungsten oxides. Examples of suitable alkali dopants (i.e., A in $A_xWO_3$) may be cesium, sodium, potassium, or rubidium. In an example, the alkali doped tungsten oxide may be doped in an amount ranging from greater than 0 mol % to about 0.33 mol % based on the total mol % of the alkali doped tungsten oxide. Suitable modified iron phosphates ($A_xFe_yPO$) may include copper iron phosphate (A=Cu, x=0.1-0.5, and y=0.5-0.9), magnesium iron phosphate (A=Mg, x=0.1-0.5, and y=0.5-0.9), and zinc iron phosphate (A=Zn, x=0.1-0.5, and y=0.5-0.9). For the modified iron phosphates, it is to be understood that the number of phosphates may change based on the charge balance with the cations. Suitable modified copper pyrophosphates ($A_xCu_yP_2O_7$) include iron copper pyrophosphate (A=Fe, x=0-2, and y=0-2), magnesium copper pyrophosphate (A=Mg, x=0-2, and y=0-2), and zinc copper pyrophosphate (A=Zn, x=0-2, and y=0-2). Combinations of the inorganic pigments may also be used.

The amount of the energy absorber that is present in the fusing agent ranges from greater than 0 wt % active to about 40 wt % active based on the total weight of the fusing agent. In other examples, the amount of the energy absorber in the fusing agent ranges from about 0.3 wt % active to 30 wt % active, from about 1 wt % active to about 20 wt % active, from about 1.0 wt % active up to about 10.0 wt % active, or from greater than 4.0 wt % active up to about 15.0 wt % active. It is believed that these energy absorber loadings provide a balance between the fusing agent having jetting reliability and heat and/or radiation absorbance efficiency.

The fusing agent may also include an FA vehicle in which the energy absorber is dispersed or dissolved to form the fusing agent. A wide variety of FA vehicles, including aqueous and non-aqueous vehicles, may be used in the fusing agent.

The solvent of the fusing agent may be water or a non-aqueous solvent (e.g., ethanol, acetone, n-methyl pyrrolidone, aliphatic hydrocarbons, etc.). In some examples, the fusing agent consists of the energy absorber and the solvent (without other components). In these examples, the solvent makes up the balance of the fusing agent. In other examples, the FA vehicle may include other components, depending, in part, upon the applicator that is to be used to dispense the fusing agent. Examples of other suitable fusing agent components include dispersant(s), silane coupling agent(s), co-solvent(s), humectant(s), surfactant(s), antimicrobial agent(s), anti-kogation agent(s), and/or chelating agent(s).

In some examples, the FA vehicle of the fusing agent may be similar to the aqueous vehicle of the epoxy agent. As such, the FA vehicle of the fusing agent may include any of the components described above in reference to the epoxy agent in any of the amount described above (with the amount(s) being based on the total weight of the fusing agent rather than the total weight of the epoxy agent).

When the energy absorber is an inorganic pigment (having absorption at wavelengths ranging from 800 nm to 4000 nm and transparency at wavelengths ranging from 400 nm to 780 nm), the FA vehicle may also include dispersant(s) and/or silane coupling agent(s).

The energy absorber (i.e., the inorganic pigment having absorption at wavelengths ranging from 800 nm to 4000 nm and transparency at wavelengths ranging from 400 nm to 780 nm) may, in some instances, be dispersed with a dispersant. As such, the dispersant helps to uniformly distribute the energy absorber throughout the fusing agent. Examples of suitable dispersants include polymer or small molecule dispersants, charged groups attached to the energy absorber surface, or other suitable dispersants. Some specific examples of suitable dispersants include a water-soluble acrylic acid polymer (e.g., CARBOSPERSE® K7028 available from Lubrizol), water-soluble styrene-acrylic acid copolymers/resins (e.g., JONCRYL® 296, JONCRYL® 671, JONCRYL® 678, JONCRYL® 680, JONCRYL® 683, JONCRYL® 690, etc. available from BASF Corp.), a high molecular weight block copolymer with pigment affinic groups (e.g., DISPERBYK®-190 available BYK Additives and Instruments), or water-soluble styrene-maleic anhydride copolymers/resins.

Whether a single dispersant is used or a combination of dispersants is used, the total amount of dispersant(s) in the fusing agent may range from about 10 wt % to about 200 wt % based on the weight of the energy absorber in the fusing agent.

A silane coupling agent may also be added to the fusing agent to help bond the organic and inorganic materials. Examples of suitable silane coupling agents include the SILQUEST® A series manufactured by Momentive.

Whether a single silane coupling agent is used or a combination of silane coupling agents is used, the total amount of silane coupling agent(s) in the fusing agent may range from about 0.1 wt % active to about 50 wt % active based on the weight of the energy absorber in the fusing agent. In an example, the total amount of silane coupling agent(s) in the fusing agent ranges from about 1 wt % active to about 30 wt % active based on the weight of the energy absorber. In another example, the total amount of silane coupling agent(s) in the fusing agent ranges from about 2.5 wt % active to about 25 wt % active based on the weight of the energy absorber.

Detailing Agents

In some examples of the 3D printing kit and/or composition and the 3D printing method disclosed herein, a detailing agent may be used. The detailing agent may include a surfactant, a co-solvent, and a balance of water. In some examples, the detailing agent consists of these components, and no other components. In some other examples, the detailing agent may further include a colorant. In still some other examples, detailing agent consists of a colorant, a surfactant, a co-solvent, and a balance of water, with no other components. In yet some other examples, the detailing agent may further include additional components, such as anti-kogation agent(s), antimicrobial agent(s), and/or chelating agent(s) (each of which is described above in reference to the fusing agent).

The surfactant(s) that may be used in the detailing agent include any of the surfactants listed above in reference to the fusing agent. The total amount of surfactant(s) in the detailing agent may range from about 0.10 wt % to about 5.00 wt % with respect to the total weight of the detailing agent.

The co-solvent(s) that may be used in the detailing agent include any of the co-solvents listed above in reference to the fusing agent. The total amount of co-solvent(s) in the detailing agent may range from about 1.00 wt % to about 20.00 wt % with respect to the total weight of the detailing agent.

In some examples, the detailing agent does not include a colorant. In these examples, the detailing agent may be colorless. As used herein, "colorless," means that the detailing agent is achromatic and does not include a colorant.

When the detailing agent includes the colorant, the colorant may be a dye of any color having substantially no absorbance in a range of 650 nm to 2500 nm. By "substantially no absorbance" it is meant that the dye absorbs no radiation having wavelengths in a range of 650 nm to 2500 nm, or that the dye absorbs less than 10% of radiation having wavelengths in a range of 650 nm to 2500 nm. The dye is also capable of absorbing radiation with wavelengths of 650 nm or less. As such, the dye absorbs at least some wavelengths within the visible spectrum, but absorbs little or no wavelengths within the near-infrared spectrum. This is in contrast to the active material in the fusing agent, which absorbs wavelengths within the near-infrared spectrum. As such, the colorant in the detailing agent will not substantially absorb the fusing radiation, and thus will not initiate melting and fusing of the build material composition in contact therewith when the build material layer is exposed to the fusing radiation. The colorant in the detailing agent may help to achieve a desired color at that edges of the 3D object that are adjacent to the build material patterned with the detailing agent.

The dye in the detailing agent may be selected so that its color matches the color of the active material in the fusing agent. As examples, the dye may be any azo dye having sodium or potassium counter ion(s) or any diazo (i.e., double azo) dye having sodium or potassium counter ion(s), where the color of azo or dye azo dye matches the color of the fusing agent.

In an example, the dye is a black dye. Some examples of the black dye include azo dyes having sodium or potassium counter ion(s) and diazo (i.e., double azo) dyes having sodium or potassium counter ion(s). Examples of azo and diazo dyes may include tetrasodium (6Z)-4-acetamido-5-oxo-6-[[7-sulfonato-4-(4-sulfonatophenyl)azo-1-naphthyl]hydrazono]naphthalene-1,7-disulfonate with a chemical structure of:

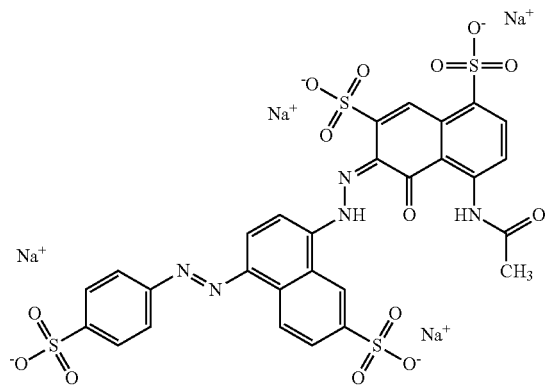

(commercially available as Food Black 1); tetrasodium 6-amino-4-hydroxy-3-[[7-sulfonato-4-[(4-sulfonatophenyl)azo]-1-naphthyl]azo]naphthalene-2,7-disulfonate with a chemical structure of:

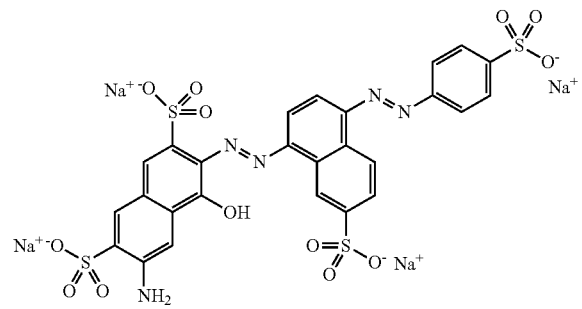

(commercially available as Food Black 2); tetrasodium (6E)-4-amino-5-oxo-3-[[4-(2-sulfonatooxyethylsulfonyl)phenyl]diazenyl]-6-[[4-(2-sulfonatooxyethylsulfonyl)phenyl]hydrazinylidene]naphthalene-2,7-disulfonate with a chemical structure of:

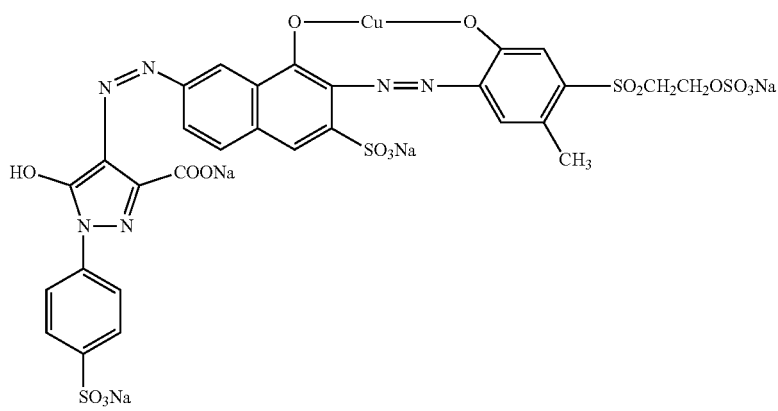

(commercially available as Reactive Black 31); tetrasodium (6E)-4-amino-5-oxo-3-[[4-(2-sulfonatooxyethylsulfonyl)p-henyl]diazenyl]-6-[[4-(2-sulfonatooxyethylsulfonyl)phenyl] hydrazinylidene]naphthalene-2,7-disulfonate with a chemical structure of:

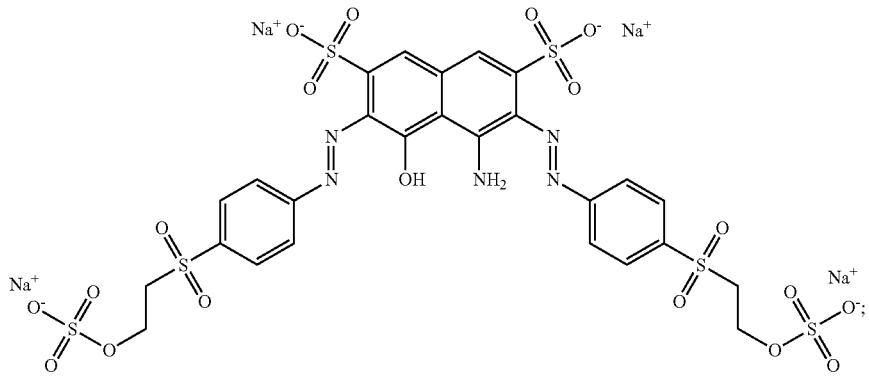

and combinations thereof. Some other commercially available examples of the dye used in the detailing agent include multipurpose black azo-dye based liquids, such as PRO-JET® Fast Black 1 (made available by Fujifilm Holdings), and black azo-dye based liquids with enhanced water fastness, such as PRO-JET® Fast Black 2 (made available by Fujifilm Holdings).

In some instances, in addition to the black dye, the colorant in the detailing agent may further include another dye. In an example, the other dye may be a cyan dye that is used in combination with any of the dyes disclosed herein. The other dye may also have substantially no absorbance above 650 nm. The other dye may be any colored dye that contributes to improving the hue and color uniformity of the final 3D part.

Some examples of the other dye include a salt, such as a sodium salt, an ammonium salt, or a potassium salt. Some specific examples include ethyl-[4-[[4-[ethyl-[(3-sulfophenyl)methyl]amino]phenyl]-(2-sulfophenyl)ethylidene]-1-cyclohexa-2,5-dienylidene]-[(3-sulfophenyl)methyl]azanium with a chemical structure of:

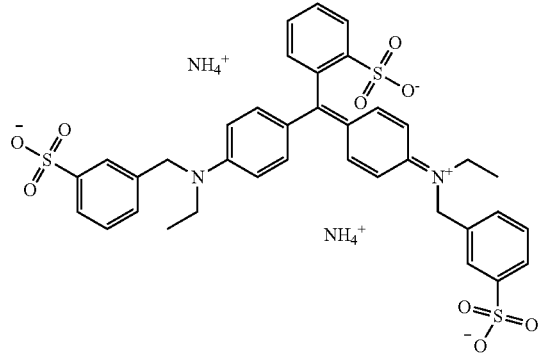 [SMILES: CCN(Cc1cccc(S(=O)(=O)[O-])c1)c1ccc(C(=C2C=CC(=[N+](CC)Cc3cccc(S(=O)(=O)[O-])c3)C=C2)c2ccccc2S(=O)(=O)[O-])cc1 ; [NH4+] ; [NH4+]]

(commercially available as Acid Blue 9, where the counter ion may alternatively be sodium counter ions or potassium counter ions); sodium 4-[(E)-{4-[benzyl(ethyl)amino]phenyl}{(4E)-4-[benzyl(ethyl)iminio]cyclohexa-2,5-dien-1-ylidene}methyl]benzene-1,3-disulfonate with a chemical structure of:

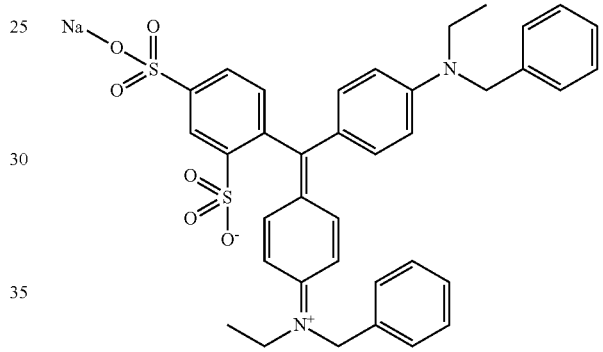

(commercially available as Acid Blue 7); and a phthalocyanine with a chemical structure of:

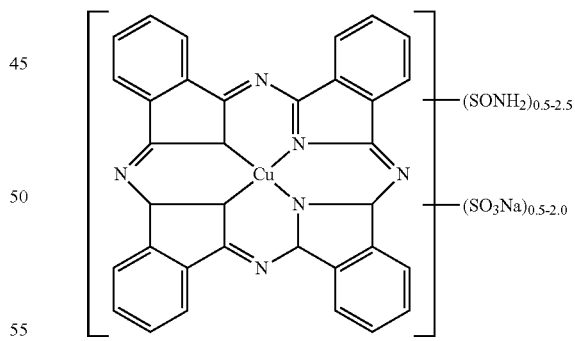

(commercially available as Direct Blue 199); and combinations thereof.

In an example of the detailing agent, the dye may be present in an amount ranging from about 1.00 wt % to about 3.00 wt % based on the total weight of the detailing agent. In another example of the detailing agent including a combination of dyes, one dye (e.g., the black dye) is present in an amount ranging from about 1.50 wt % to about 1.75 wt % based on the total weight of the detailing agent, and the other dye (e.g., the cyan dye) is present in an amount ranging from about 0.25 wt % to about 0.50 wt % based on the total weight of the detailing agent.

The balance of the detailing agent is water. As such, the amount of water may vary depending upon the amounts of the other components that are included.

Printing Methods and Methods of Use

Referring now to FIG. 1, an example of a 3D printing method 100 is depicted. The example method 100 may use examples of the 3D printing kit and/or composition and/or multi-fluid kit disclosed herein. The method 100 includes applying a build material composition to form a build material layer, the build material composition including a polyamide (reference numeral 102); based on a 3D object model, selectively melting the polyamide in at least a portion of the build material layer to form a molten portion including molten polyamide (reference numeral 104); and based on the 3D object model, selectively applying an epoxy agent on the molten portion of the build material layer, the epoxy agent including a polyfunctional epoxy that crosslinks the molten polyamide in the molten portion (reference numeral 106).

The method 100 shown in FIG. 1 may be used to form one layer of a 3D object. This process may be repeated layer by layer to build the entire 3D object. In an example, to build up the entire 3D object, the method 100 may further include iteratively applying the build material composition to form additional build material layers; based on the 3D object model, selectively melting the polyamide in at least a portion of each of the additional build material layers to form additional molten portions including additional molten polyamide; and based on the 3D object model, selectively applying the epoxy agent on each of the additional molten portions, wherein the polyfunctional epoxy crosslinks the additional molten polyamide in each of the additional molten portions.

In some examples of the method 100, the selective melting of the polyamide involves selectively applying a fusing agent on at least a portion of the build material layer, and exposing the build material layer to electromagnetic radiation. These examples will be described further in reference to FIG. 2 and FIG. 3A through FIG. 3D. In other examples of the method 100, the selective melting of the polyamide involves selectively exposing at least a portion of the build material layer to a laser. These examples will be described further in reference to FIG. 4A through FIG. 4C.

Selective Melting with a Fusing Agent and Radiation Exposure

Figure 2:
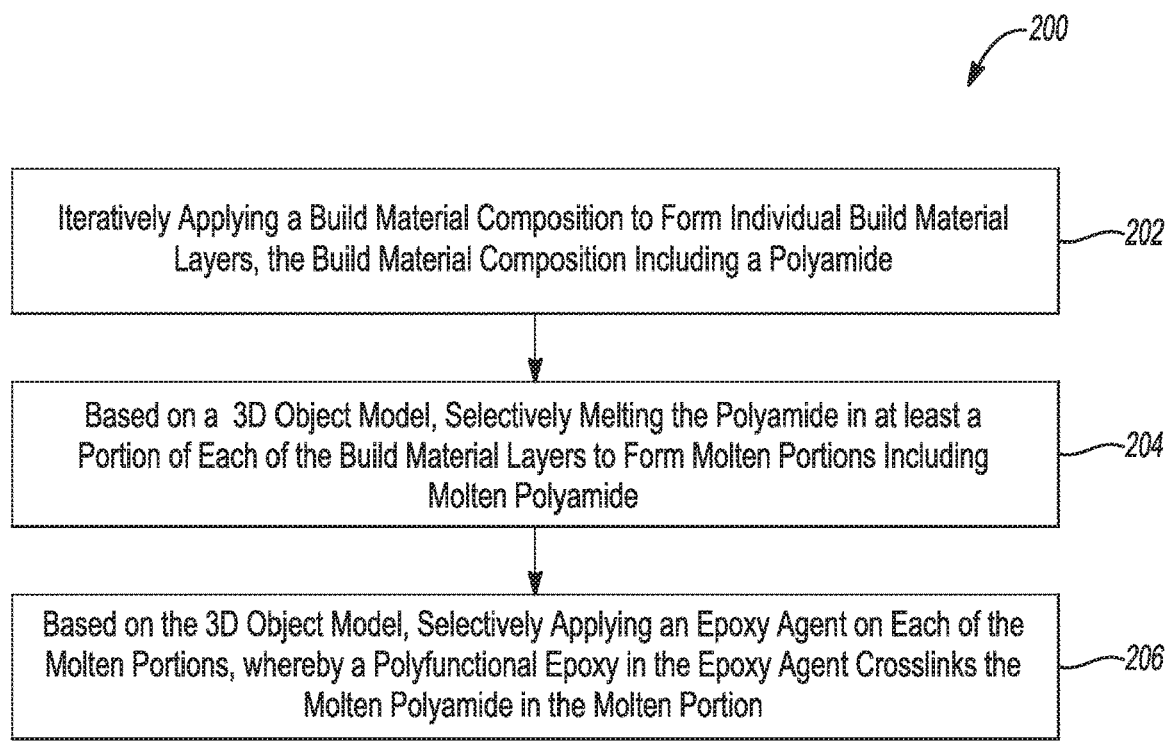
FIG. 2 is a flow diagram depicting an example of the 3D printing method using a fusing agent.

FIG. 2 depicts a n example of the method 200, which is an example of the method 100 where the selective melting is performed using a fusing agent and exposure to radiation. As depicted, this example of the method 200 includes iteratively applying a build material composition to form a build material layers, the build material composition including a polyamide (reference numeral 202); based on a 3D object model, selectively melting the polyamide in at least a portion of each of the build material layers to form a molten portions including molten polyamide (reference numeral 204); and based on the 3D object model, selectively applying an epoxy agent on each of the molten portions, whereby a polyfunctional epoxy in the epoxy agent crosslinks the molten polyamide in the molten portions (reference numeral 206).

The methods 100, 200 may use a 3D printing system. As depicted in FIG. 3A through FIG. 3D, the 3D printing system 10 includes a supply of build material composition 12 including a polyamide; a build material distributor 20; a supply of an epoxy agent 14 including a polyfunctional epoxy; an applicator 28A for selectively dispensing the epoxy agent 14; an energy source 36; a controller 46; and a non-transitory computer readable medium 48 having stored thereon computer executable instructions 50 to cause the controller 46 to utilize the heat source 36 to selectively heat the build material composition 12 to form a molten portion; and utilize the applicator 28A to selectively dispense the epoxy agent 14 on the molten portion. More specifically, this example system 10 includes a supply bed 16 (including the supply of build material composition 12), a delivery piston 18, the build material distributor 20, a fabrication bed 22 (having a contact surface 23), a fabrication piston 24, inkjet applicators 28A, 28B, 28C, and the heat source 36.

Each of these physical elements of the 3D printing system 10 may be operatively connected to the controller 46. An example of the controller 46 includes a central processing unit. The controller 46 (e.g., running computer readable instructions 50 stored on a non-transitory, tangible computer readable storage medium 48) manipulates and transforms data represented as physical (electronic) quantities within the printer's registers and memories in order to control the physical elements to create the 3D object. The data for the selective delivery of the build material composition 12, the epoxy agent 14, the fusing agent 26, etc. may be derived from a 3D model of the 3D object to be formed. For example, the instructions 50 may cause the controller 46 to utilize a build material distributor 20 to dispense the build material composition 12, and to utilize an applicator 28A, 28B and/or 28C to selectively dispense the epoxy agent 14 and/or the fusing agent 26 and/or the detailing agent 15. The controller 46 controls the selective delivery (i.e., dispensing) of the epoxy agent 14 (and in some instances the fusing agent 26 and/or the detailing agent 15) in accordance with delivery control data.

The methods 100, 200 involve applying the build material composition 12 to form a build material layer 30. As mentioned above, in examples of the methods 100, 100', the build material composition 12 includes at least a polyamide having an amino functional group. In these examples, the build material composition 12 may further include the glass, the filler, the antioxidant, the whitener, the antistatic agent, the flow aid, or combinations thereof.

Figure 3A:
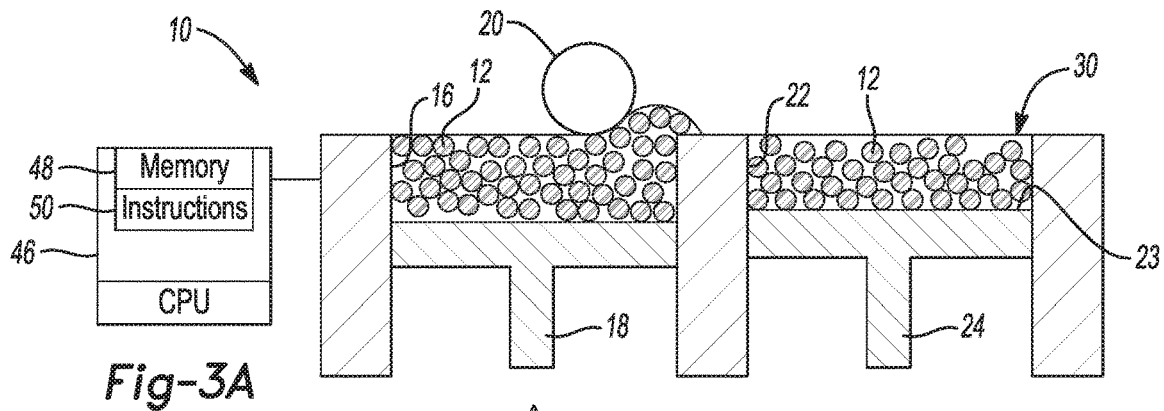
FIGS. 3A through 3D are schematic illustrations which together depict an example of the 3D printing method of FIG. 2.

An example of the application of the build material composition 12 is shown in FIG. 3A. The delivery piston 18 and the fabrication piston 24 may be the same type of piston, but are programmed to move in opposite directions. In an example, when a layer of the 3D object is to be formed, the delivery piston 18 may be programmed to push a predetermined amount of the build material composition 12 out of the opening in the supply bed 16 and the fabrication piston 24 may be programmed to move in the opposite direction of the delivery piston 18 in order to increase the depth of the fabrication bed 22. The delivery piston 18 will advance enough so that when the build material distributor 20 pushes the build material composition 12 into the fabrication bed 22 and onto the contact surface 23 or a previously formed layer, the depth of the fabrication bed 22 is sufficient so that a layer 30 of the build material composition 12 may be formed in the fabrication bed 22. The build material distributor 20 is capable of spreading the build material composition 12 into the fabrication bed 22 to form a build material layer 30, which is relatively uniform in thickness.

In an example, the build material layer 30 has a thickness ranging from about 50 μm to about 120 μm. In another example, the thickness of the build material layer 30 ranges from about 30 µm to about 300 µm. It is to be understood that thinner or thicker layers may also be used. For example, the thickness of the build material layer 30 may range from about 20 µm to about 500 µm. The layer thickness may be about 2× (i.e., 2 times) the average diameter of the build material composition particles at a minimum for finer part definition. In some examples, the layer thickness may be about 1.2× the average diameter of the build material composition particles.

While one example of the printing system 10 is depicted, it is to be understood that other printing systems may also be used. For example, another support member, such as a build area platform, a platen, a glass plate, or another build surface may be used instead of the fabrication bed 22. As another example, another build material supply, such as a container or other surface that is to position the build material composition 12 between the build material distributor 20 and the contact surface 23 may be used instead of the supply bed 16. In some examples, the build material supply may include a surface upon which the build material composition 12 may be supplied, for instance, from a build material source (not shown) located above the build material supply.

The build material distributor 20 may be moved over the supply bed 16 and across the contact surface 23 to spread a layer of the build material composition 12 over the contact surface 23. The build material distributor 20 may also be returned to a position adjacent to the supply bed 16 following the spreading of the build material composition 12. The build material distributor 20 may be a blade (e.g., a doctor blade), a roller, a combination of a roller and a blade, and/or any other device capable of spreading the build material composition 12 over the contact surface 23. For instance, the build material distributor 20 may be a counter-rotating roller. In some examples, the build material supply 16 or a portion of the build material supply 16 may translate along with the build material distributor 20 such that build material composition 20 is delivered continuously to the build material distributor 20 rather than being supplied from a single location at the side of the printing system as depicted in FIG. 3A.

In some examples (not shown), after the build material composition 12 has been applied, and prior to further processing, the build material layer 30 may be exposed to heating. Heating may be performed to pre-heat the build material composition 12, and thus the pre-heating heating temperature may be below the melting point of the polyamide of the build material composition 12. As such, the pre-heating temperature selected will depend upon the polyamide that is used. As examples, the pre-heating temperature may be from about 5° C. to about 50° C. below the melting point of the polyamide. In an example, the pre-heating temperature ranges from about 50° C. to about 205° C. In another example, the pre-heating temperature ranges from about 100° C. to about 205° C. In yet another example, the pre-heating temperature ranges from about 100° C. to about 190° C.

Pre-heating the layer 30 of the build material composition 12 may be accomplished by using any suitable heat source that exposes all of the build material composition 12 in the fabrication bed 22 to the heat. Examples of the heat source include a thermal heat source (e.g., a heater (not shown) integrated into the fabrication bed 22 (which may include sidewalls)) or the energy source 36.

Figure 3B:
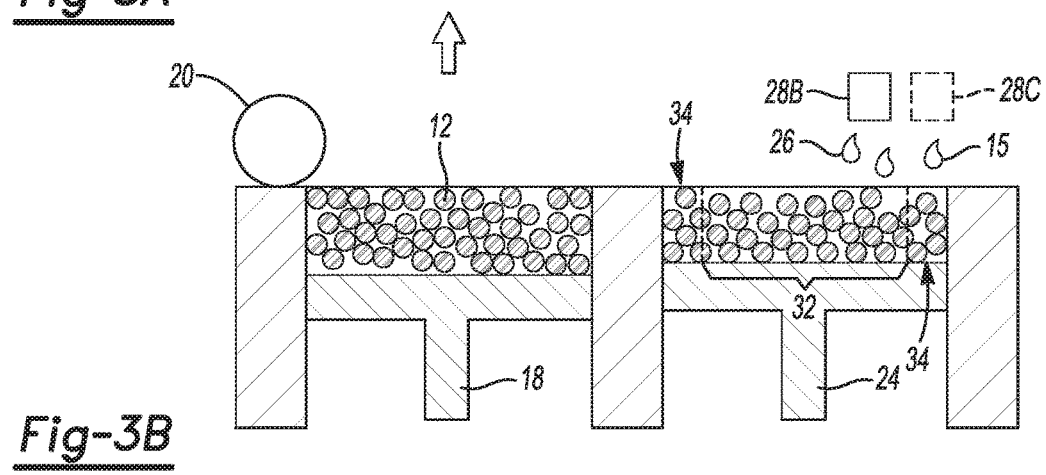

After the layer 30 is formed, and in some instances is pre-heated, the method 200 involves selectively applying the fusing agent 26 on at least a portion 32 of the build material layer 30, as shown in FIG. 3B. It is to be understood that a single fusing agent 26 may be selectively applied on the build material layer 30, or multiple fusing agents 26 may be selectively applied on the build material layer 30. The selective application of the fusing agent 26 patterns one layer 30 in accordance with the 3D object model.

The volume of the fusing agent 26 that is applied per unit of the build material composition 12 in the patterned portion 32 may be sufficient to absorb and convert enough electromagnetic radiation so that the build material composition 12 in the patterned portion 32 will become molten during radiation exposure. The volume of the fusing agent 26 that is applied per unit of the build material composition 12 may depend, at least in part, on the energy absorber used, the energy absorber loading in the fusing agent 26, and the build material composition 12 used.

Figure 3C:
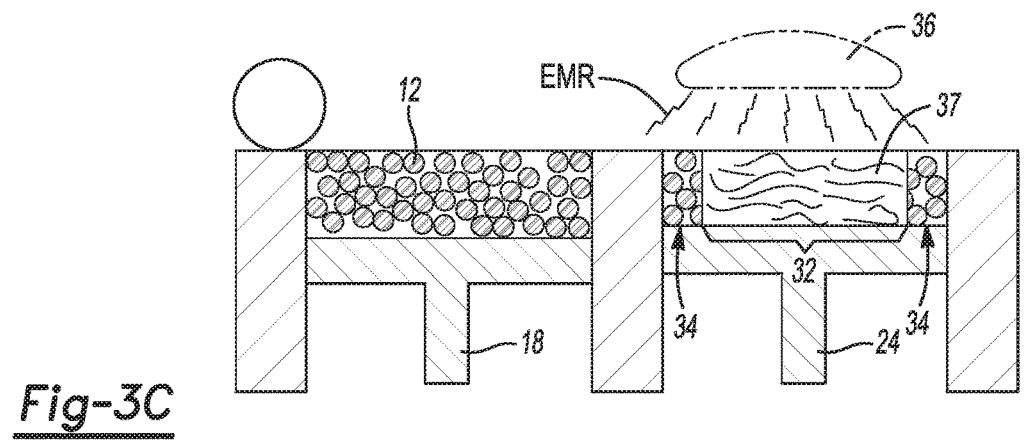
Figure 3D:
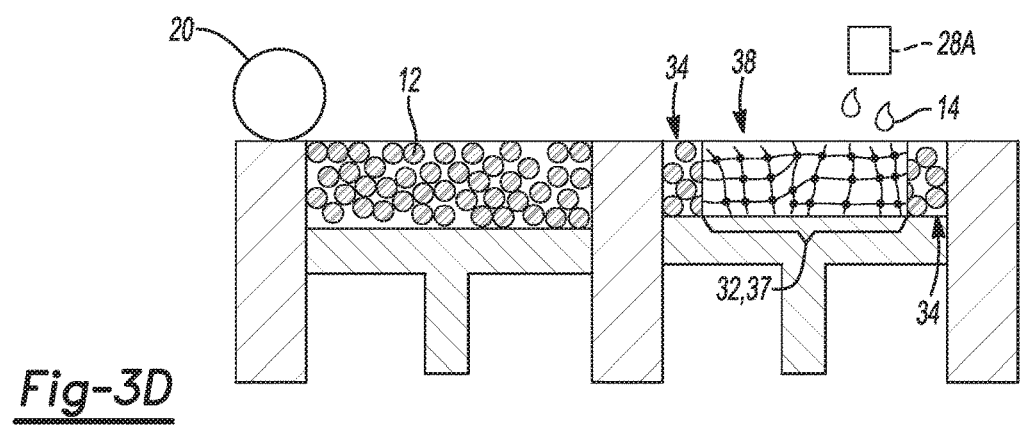

The portion(s) 34 are not patterned with the fusing agent 26, and thus are not to become part of the final 3D object layer 38 (FIG. 3D). In one example of the method 200, no agents are applied on the portion(s) 34. In another example of the method 200, as shown in FIG. 3B, the detailing agent 15 is selectively applied to the portion(s) 34 of the layer 30. The detailing agent 15 may provide an evaporative cooling effect to the build material composition 12 to which it is applied. The evaporative cooling effect of the detailing agent 15 may be used to aid in preventing the build material composition 12 in the portion(s) 34 from coalescing/fusing. The evaporative cooling provided by the detailing agent 14 may remove energy from the portion(s) 34, which may lower the temperature of the build material composition 12 in the portion(s) 34 and prevent the build material composition 12 in the portion(s) 34 from coalescing/fusing.

In examples of the method 200, any of the agents 26, 15 may be dispensed from an applicator 28B, 28C. The applicator(s) 28B, 28C may each be in inkjet applicator, such as a thermal inkjet printhead or print bar, a piezoelectric printhead or print bar, a continuous inkjet printhead or print bar, etc. The selective application of the agent(s) 26, 15 may thus be accomplished by thermal inkjet printing, piezo electric inkjet printing, continuous inkjet printing, etc. The inkjet applicator(s) 28B, 28C may include nozzles, fluid slots, and/or fluidics for dispensing the agents 26, 15. The controller 46 may process data, and in response, control the applicator(s) 28B, 28C to deposit the agent(s) 26, 15 onto predetermined portion(s) 32, 34 of the build material composition 12. It is to be understood that the applicators 28B, 28C may be separate applicators or a single applicator with several individual cartridges for dispensing the respective agents 26, 15.

The applicator(s) 28B, 28C may be scanned adjacent to the contact surface 23 to deposit the agents 26, 15 over the layer 30 of the build material composition 12. The applicator(s) 28B, 28C may thus be attached to a moving XY stage or a translational carriage (neither of which is shown) that moves the applicator(s) 28B, 28C adjacent to the contact surface 23 in order to deposit the agents 26, 15 in predetermined areas of a layer 30 of the build material composition 12 that has been formed on the contact surface 23 or on a previously formed 3D object layer 38 in accordance with the method(s) disclosed herein.

It is to be understood that the selective application of the agent(s) 26, 15 may be accomplished in a single printing pass or in multiple printing passes. In some examples, the agent(s) 26, 15, is/are selectively applied in a single printing pass. In some other examples, the agent(s) 26, 15 is/are selectively applied in multiple printing passes. In one of these examples, the number of printing passes ranging from 2 to 4. It may be desirable to apply the agent(s) 26, 15 in multiple printing passes to increase the amount, e.g., of the energy absorber, detailing agent, etc. that is applied to the build material composition 12, to avoid liquid splashing, to avoid displacement of the build material composition 12, etc.

After the agent(s) 26, 15 is/are selectively applied in the specific portion(s) 32, 34 of the layer 30, the entire layer 30 of the build material composition 12 is exposed to electromagnetic radiation, shown as EMR in FIG. 3C.

The electromagnetic radiation EMR is emitted from the energy source 36. The energy source 36 may be any source that emits electromagnetic radiation EMR that can be absorbed by the energy absorber in the fusing agent 26. In an example, the energy source 36 emits electromagnetic radiation having a wavelength ranging from about 400 nm to about 4000 nm. In some examples, the electromagnetic radiation EMR has a wavelength ranging from 800 nm to 1700 nm, or from 800 nm to 1400 nm, or from 800 nm to 1200 nm. Examples of suitable energy sources 36 include an IR or near-IR curing lamp, or IR or near-IR light emitting diodes (LED), lasers with specific IR or near-IR wavelengths, visible light sources, or the like.

The energy source 36 may be a stationary lamp or a moving lamp. The stationary lamp may be in a fixed position relative to the fabrication bed 22, and may be turned on when radiation exposure is desired and off when radiation exposure is not desired. The moving lamp(s) can be mounted on a track (e.g., translational carriage) to move across the fabrication bed 22. This allows for printing and radiation exposure in a single pass. Such lamps can make multiple passes over the fabrication bed 22 depending on the amount of exposure utilized in the method(s) disclosed herein.

As such, the electromagnetic radiation EMR exposure may be accomplished in a single radiation event or in multiple radiation events. In an example, the exposing of the build material composition 12 is accomplished in multiple radiation events. In a specific example, the number of radiation events ranges from 3 to 8. It may be desirable to expose the build material composition 12 to electromagnetic radiation in multiple radiation events to counteract a cooling effect that may be brought on by the amount of the fusing agent 26 that is applied to the build material layer 30. Additionally, it may be desirable to expose the build material composition 12 to electromagnetic radiation EMR in multiple radiation events to sufficiently elevate the temperature of the build material composition 12 in the portion(s) 32, without over heating the build material composition 12 in the portion(s) 34.

The length of time the electromagnetic radiation EMR is applied for, or energy exposure time, may be dependent, for example, on one or more of: characteristics of the energy source 36; characteristics of the build material composition 12; and/or characteristics of the fusing agent 26.

The fusing agent 26 enhances the absorption of the radiation, converts the absorbed radiation to thermal energy, and promotes the transfer of the thermal heat to the build material composition 12 in contact therewith. In an example, the fusing agent 26 sufficiently elevates the temperature of the build material composition 12 in the portion 32 to a temperature above the melting point of the polyamide material, allowing the patterned polyamide to form a molten portion(s) 37 including molten polyamide. Radiation having wavelengths within the provided ranges may be absorbed (e.g., 80% or more of the applied radiation is absorbed) by the fusing agent 26 and may heat the build material composition 12 in contact therewith to form the molten portion(s) 37, and may not be substantially absorbed (e.g., 25% or less of the applied radiation is absorbed) by the build material composition 12 in portion(s) 34.

As shown in FIG. 3D, the method 200 further includes the selective application of the epoxy agent 14 on the molten portion(s) 37. The temperature of the molten portion 37 is sufficient to initiate a crosslinking reaction between at least some of the epoxide functional groups of the polyfunctional epoxy in the epoxy agent 14 and at least some of the amino functional group of the molten polyamide in the molten portion 37. A crosslinked, thermoset composition is formed wherever the epoxy agent 14 is applied to the molten portion 37.

The applicator 28A selectively applies the epoxy agent 14 on those molten portions 37 that are to be crosslinked and form the final 3D object. If it is desirable for some of the molten portion 37 to remain non-crosslinked, the epoxy agent 14 may not be applied to the entire molten portion 37. It is to be understood that any region of the molten portion 37 that does not have the epoxy agent 14 applied thereon does not form the crosslinked, thermoset composition, but does melt and coalesce to become part of the 3D layer 38 that is formed.

The epoxy agent 14 may be selectively applied on the build material composition 12 in an amount such that the polyfunctional epoxy makes up from about 2 wt % to about 15 wt % of the 3D object layer 38, based on the total weight of the 3D object layer 38. In one example, the epoxy agent 14 may be selectively applied on the molten portion 37 in an amount such that the polyfunctional epoxy makes up about 5 wt % of the resulting 3D object layer 38, based on the total weight of the 3D object layer 38. The amount of the epoxy agent 14 applied may depend, at least in part, on the polyfunctional epoxy used, the epoxy loading in the epoxy agent 14, and the build material composition 12 used.

The applicator 28A may be an inkjet applicator as described herein for the applicators 28B, 28C, and may be operated in a similar many in order to selectively deposit the epoxy agent 14 at desirable regions of the molten portion 37.

After the 3D object layer 38 is formed, additional layer(s) may be formed thereon to create an example of the 3D object. To form the next layer, additional build material composition 12 may be applied on the layer 38. The fusing agent 26 is then selectively applied on at least a portion of the additional build material composition 12, according to the 3D object model. The detailing agent 15 may be applied in any area of the additional build material composition 12 where melting and coalescence is not desirable. After the agent(s) 26, 15 is/are applied, the entire layer of the additional build material composition 12 is exposed to electromagnetic radiation in the manner described herein in reference to FIG. 3C to form the molten portion(s) 37. The epoxy agent 14 may then be applied to all or some of the molten portion 37 in order to crosslink the molten portion 37 and another 3D object layer. This sequence may be repeated a predetermined number of cycles to form the final 3D object in accordance with the 3D object model.

The build material composition 12 that does not become part of the 3D object (e.g., the build material composition in portion(s) 34) may be reclaimed to be reused as build material in the printing of another 3D object.

This example of the method 100 may also include cooling the 3D object. Cooling may be performed at a cooling rate ranging from about 0.01° C./minute to about 10° C./minute. The cooling rate may depend, in part, upon the polyamide used and the cooling process used. In an example, the cooling rate ranges from about 0.01° C./minute to about 1°

C./minute. Cooling may be passive, e.g., by allowing the 3D object to cool down to remove temperature, or active, e.g., by exposing the 3D object to cool air, a cool liquid, refrigeration, etc. The crosslinked polymer chains of the 3D object (or at least a portion of the 3D object) have a restricted degree of freedom during cooling, which results in the formation of fewer crystal regions during cooling.

Selective Melting with a Laser

Figure 4A:
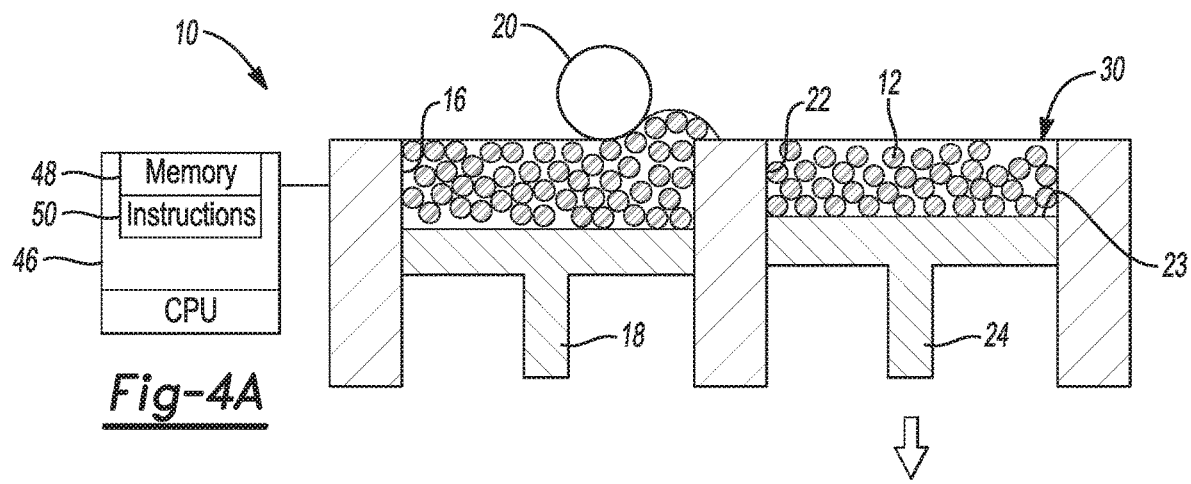
FIGS. 4A through 4C are schematic illustrations which together depict another example of the 3D printing method.
Figure 4B:
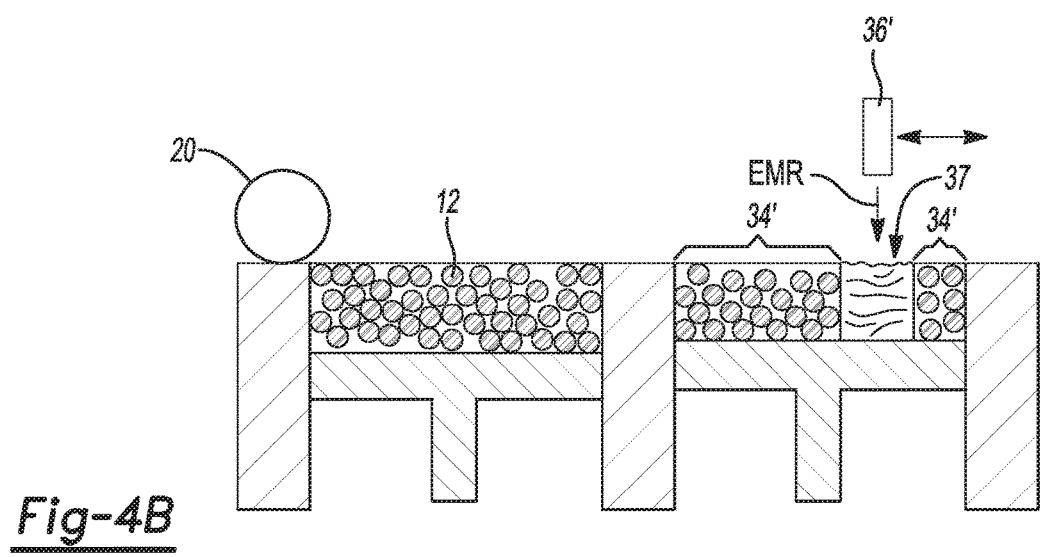
Figure 4C:
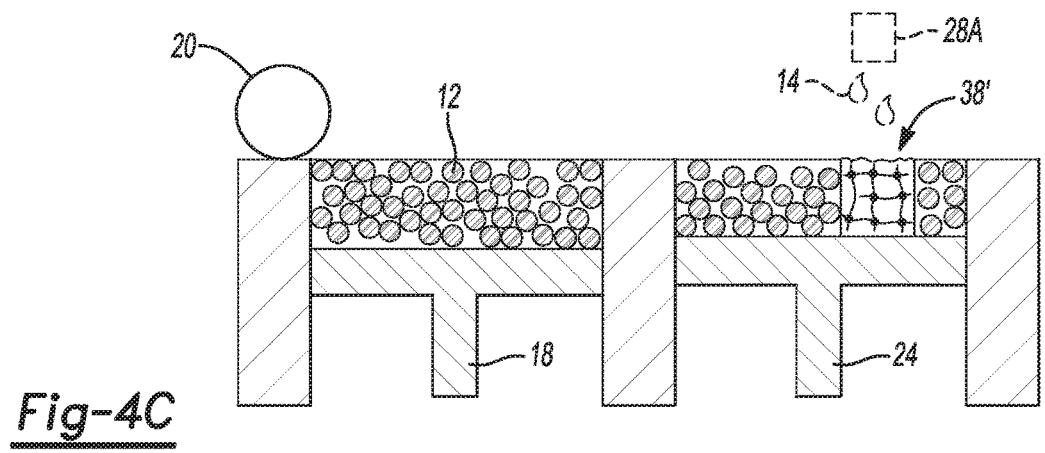

Another example of the method is described in reference to FIG. 4A through FIG. 4C, where the selective melting is performed using a laser. In this example of the method 100, no fusing agent 26 is applied on the build material composition 12. Rather, this example of the method 100 includes iteratively applying a build material composition 12 to form a build material layers 30, the build material composition 12 including a polyamide; based on a 3D object model, selectively melting, using a laser 40, the polyamide in at least a portion of each of the build material layers 30 to form a molten portions 37 including molten polyamide; and based on the 3D object model, selectively applying an epoxy agent 14 on each of the molten portions 37, whereby a polyfunctional epoxy in the epoxy agent crosslinks the molten polyamide in the molten portions 37.

In FIG. 4A, a layer 30 of the build material composition 12 is applied on the fabrication bed 22 as described in reference to FIG. 3A (e.g. from supply bed 16 and using build material distributor 20). The layer 30 has a substantially uniform thickness across the contact surface 23.

After the build material composition 12 has been applied, the build material layer 30 is selectively exposed to radiation from the energy source 36', as shown in FIG. 4B. In this example, the energy source 36' may be a laser or other tightly focused energy source that may selectively apply radiation (shown as EMR in FIG. 4B) to the build material layer 30. The laser may emit light through optical amplification based on the stimulated emission of radiation. The laser may emit light coherently (i.e., constant phase difference and frequency), which allows the radiation to be emitted in the form of a laser beam that stays narrow over large distances and focuses on a small area. In some examples, the laser or other tightly focused energy source may be a pulse laser (i.e., the optical power appears in pluses). Using a pulse laser allows energy to build between pluses, which enables the beam to have more energy. A single laser or multiple lasers may be used. The energy source 36' can be mounted on a track (e.g., translational carriage) to move across the fabrication bed 22. Such lamps can make multiple passes over the fabrication bed 22 depending on the amount of exposure utilized in the method(s) disclosed herein.

The radiation from the energy source 36' heats the portion(s) 32' of the build material composition 12 exposed thereto, and does not heat the portion(s) 34'. In an example, the radiation from the energy source 36' elevates the temperature of the build material composition 12 in the portion 32'. In other words, the radiation from the energy source 36' sufficiently elevates the temperature of the build material composition 12 in the portion 32' to a temperature above the melting point of the polyamide material, allowing the polyamide to form a molten portion(s) 37 including molten polyamide.

As shown in FIG. 4C, the epoxy agent 14 may then be selectively applied to the molten portion 37 as described in reference to FIG. 3D. The temperature of the molten portion 37 is sufficient to initiate a crosslinking reaction between at least some of the epoxide functional groups of the polyfunctional epoxy in the epoxy agent 14 and at least some of the amino functional group of the molten polyamide in the molten portion 37. A crosslinked, thermoset composition is formed wherever the epoxy agent 14 is applied to the molten portion 37. This process forms one layer 38' of a 3D object.

After the 3D object layer 38' is formed, additional layer(s) may be formed thereon to create an example of the 3D object. To form the next layer, additional build material composition 12 may be applied on the layer 38'. The selected portion(s) 32' of the additional build material composition 12 is/are exposed to electromagnetic radiation in the manner described herein in reference to FIG. 4B to form the molten portion(s) 37. The epoxy agent 14 may then be applied to all or some of the molten portion 37 in order to crosslink the molten portion 37 and another 3D object layer. This sequence may be repeated a predetermined number of cycles to form the final 3D object in accordance with the 3D object model.

The build material composition 12 that does not become part of the 3D object (e.g., the build material composition in portion(s) 34) may be reclaimed to be reused as build material in the printing of another 3D object.

This example of the method 100 may also include cooling the 3D object as described herein.

To further illustrate the present disclosure, an example is given herein. It is to be understood that this example is provided for illustrative purposes and is not to be construed as limiting the scope of the present disclosure.

EXAMPLE

A polyamide 12 build material was used. The build material included less than 5 wt % of additives (i.e., antioxidant(s), whitener(s), antistatic agent(s), and flow aid(s)).

Two different inkjettable water based fusing agents were used. One included carbon black as the energy absorber and the other included a nickel dithiolene complex as the energy absorber.

An example epoxy agent was used. The epoxy used in the example epoxy agent was a mixture of a difunctional epoxy (ethylene glycol diglycidiyl ether) and a trifunctional epoxy (triphenylolmethane triglycidyl ether). The co-solvent/humectant was diethylene glycol butyl ether. The remainder of the epoxy agent was a water-based vehicle including a co-solvent, an anti-kogation agent, surfactants, a chelating agent, and antimicrobial agents. The general formulation of the example epoxy agent is shown in Table 1, with the wt % active of each component that was used, based on the total weight of the example epoxy agent.

TABLE 1

| Ingredient | Example epoxy agent (wt %) |
|---|---|
| Polyfunctional Epoxies | 20 |
| Co-solvent/Humectant | 40 |
| Aqueous-based Vehicle | 40 |

3D objects (in the shape of dog bones) were printed on a small testbed 3D printer.

Comparative 3D dogbones were printed by iteratively depositing the different fusing agents on build material layers and exposing the layers to near-IR radiation. Comp. Part 1 was printed with the carbon black fusing agent and Comp. Part 2 was printed with the nickel dithiolene fusing agent.

Example 3D dogbones were printed by iteratively depositing the different fusing agents on build material layers, exposing the layers near-IR radiation, and then depositing the epoxy agent on the molten portions of the layers. Ex. Part 1 was printed with the carbon black fusing agent and the epoxy agent and Ex. Part 2 was printed with the nickel dithiolene complex fusing agent and the epoxy agent.

All of the parts were allowed to cool.

The elongation at break (strain, %), ultimate tensile strength (stress, MPa), and Young's Modulus (MPa) of each of the comparative and example dogbones was measured using Instron testing equipment. The values for each of these measurements are shown in FIG. 5.

Figure 5:
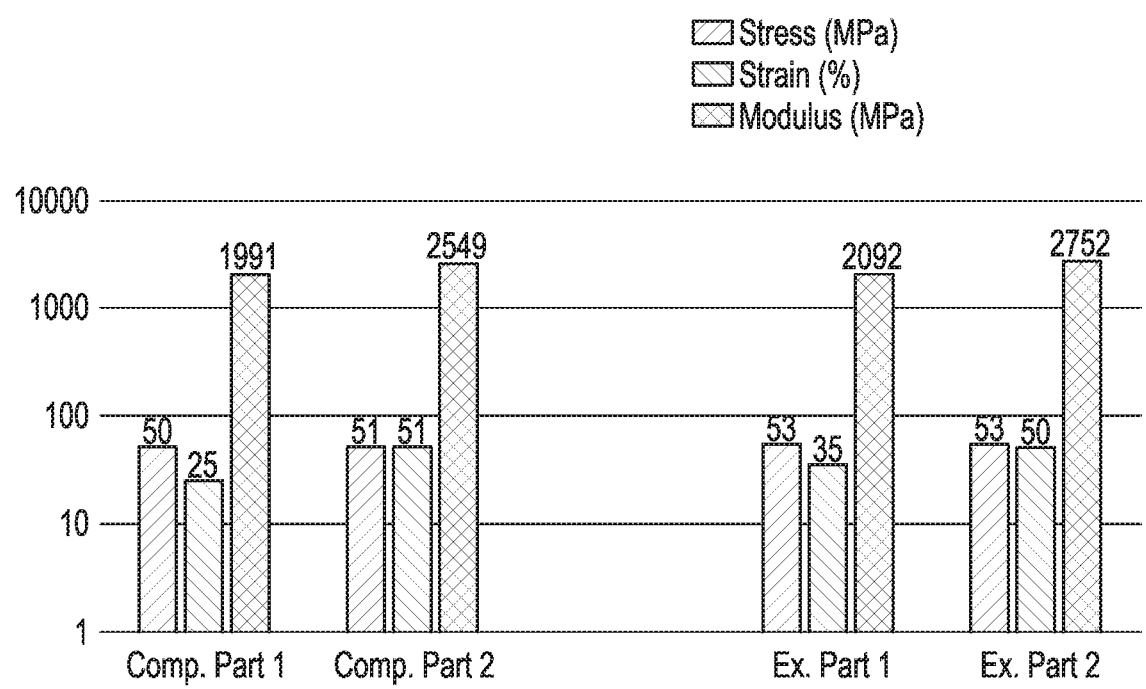
FIG. 5 is a graph depicting ultimate tensile strength (stress, MPa), elongation at break (strain, %), and Young's Modulus (MPa) for comparative 3D printed dog bones and example 3D printed dog bones.

As shown in FIG. 5, Ex. Part 1 (formed with the carbon black fusing agent) had lower elongation (strain, %) and modulus (MPa) compared to Ex. Part 2 (formed with the nickel dithiolene complex fusing agent). This may be due to the carbon black acting as a nucleation site for crystal growth during cooling, which may promote the formation of crystal regions. However, as shown in FIG. 5, both Ex. Parts 1 and 2 had higher or comparable elongation, and higher modulus and ultimate tensile strength when compared, respectively, to Comp. Ex. Parts 1 and 2 formed with the same fusing agent but without the epoxy agent. These results indicate the addition of the epoxy to the molten polyamide results in reduced crystallization, and thus increased elongation.

It is to be understood that the ranges provided herein include the stated range and any value or sub-range within the stated range, as if such values or sub-ranges were explicitly recited. For example, from about 2 wt % to about 50 wt % should be interpreted to include not only the explicitly recited limits of from about 2 wt % to about 50 wt %, but also to include individual values, such as about 2.5 wt %, about 14.67 wt %, about 27.0 wt %, about 39.75 wt %, etc., and sub-ranges, such as from about 4 wt % to about 45 wt %, from about 15.2 wt % to about 31.2 wt %, from about 24.75 wt % to about 35.79 wt %, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A method for three-dimensional (3D) printing, comprising:
    applying a build material composition to form a build material layer, the build material composition including a polyamide;
    based on a 3D object model, selectively melting the polyamide in at least a portion of the build material layer to form a molten portion including molten polyamide; and
    based on the 3D object model, selectively applying an epoxy agent on the molten portion of the build material layer, the epoxy agent including a polyfunctional epoxy that crosslinks the molten polyamide in the molten portion.

2. The method as defined in claim 1, further comprising building a 3D object by:
    iteratively applying the build material composition to form additional build material layers;
    based on the 3D object model, selectively melting the polyamide in at least a portion of each of the additional build material layers to form additional molten portions including additional molten polyamide; and
    based on the 3D object model, selectively applying the epoxy agent on each of the additional molten portions;
    wherein the polyfunctional epoxy crosslinks the additional molten polyamide in each of the additional molten portions.

3. The method as defined in claim 2, further comprising cooling the 3D object at a cooling rate ranging from about 0.01° C./minute to about 10° C./minute.

4. The method as defined in claim 1 wherein the selective melting of the polyamide involves:
    based on the 3D object model, selectively applying a fusing agent on the at least the portion of the build material layer; and
    exposing the build material layer to electromagnetic radiation.

5. The method as defined in claim 4 wherein the fusing agent includes an energy absorber selected from the group consisting of lanthanum hexaboride, tungsten bronzes, indium tin oxide, antimony tin oxide, titanium nitride, aluminum zinc oxide, ruthenium oxide, silver, gold, platinum, iron pyroxenes, modified iron phosphates, modified copper phosphates, modified copper pyrophosphates, and combinations thereof.

6. The method as defined in claim 4 wherein the fusing agent includes a near-infrared absorbing colorant.

7. The method as defined in claim 1 wherein the selective melting of the polyamide involves selectively exposing, based on the 3D object model, the at least the portion of the build material layer to a laser.

8. The method as defined in claim 1 wherein the polyfunctional epoxy in the epoxy agent includes a difunctional epoxy, and the difunctional epoxy is selected from the group consisting of ethylene glycol diglycidyl ether, resorcinol diglycidyl ether, neopentyl glycol diglycidyl ether, 1,6-hexanediol diglycidyl ether, glycerol diglycidyl ether, trimethylolpropane diglycidyl ether, pentaerythritol diglycidyl ether, diglycerol diglycidyl ether, polyglycerol diglycidyl ether, sorbitol diglycidyl ether, diglycidyl terephthalate, diglycidyl o-phthalate, polyethylene glycol diglycidyl ether, and a combination thereof.

9. The method as defined in claim 1 wherein the polyfunctional epoxy in the epoxy agent includes a trifunctional epoxy, and the trifunctional epoxy is selected the group consisting of triphenylolmethane triglycidyl ether, glycerol triglycidyl ether, trimethylolpropane triglycidyl ether, pentaerythritol triglycidyl ether, diglycerol triglycidyl ether, polyglycerol triglycidyl ether, sorbitol triglycidyl ether, and a combination thereof.

10. The method as defined in claim 1 wherein the polyfunctional epoxy is selected the group consisting of tetraphenylolethane glycidyl ether, pentaerythritol glycidyl ether, poly(glycidyl methacrylate), poly(ethylene-co-glycidyl methacrylate), poly(tert-butyl methacrylate-co-glycidyl methacrylate), poly(pentabromobenzyl methacrylate-co-glycidyl methacrylate), and a combination thereof.

11. The method as defined in claim 1 wherein the epoxy agent includes the polyfunctional epoxy in an amount ranging from about 2 wt % active to about 50 wt % active, based on a total weight of the epoxy agent.

12. The method as defined in claim 1 wherein the selectively applying of the epoxy agent is accomplished by thermal inkjet printing, piezoelectric inkjet printing, or continuous inkjet printing.

13. The method as defined in claim 1 wherein the polyamide is selected from the group consisting of polyamide 11, polyamide 12, polyamide 12-GB, polyamide 6, polyamide 13, polyamide 6,13, polyamide 8, polyamide 9, polyamide 66, polyamide 612, polyamide 812, polyamide 912, a polyamide copolymer, and a combination thereof.

14. A method for three-dimensional (3D) printing, comprising:
   iteratively applying a build material composition to form individual build material layers, the build material composition including a polyamide;
   based on a 3D object model, selectively applying a fusing agent on at least a portion of each of the build material layers;
   exposing each of the build material layers to electromagnetic radiation to melt the polyamide in the at least the portion of each of the build material layers and form molten portions including the molten polyamide; and
   based on the 3D object model, selectively applying an epoxy agent on each of the molten portions, whereby a polyfunctional epoxy in the epoxy agent crosslinks the molten polyamide in each of the molten portions.

* * * * *